United States Patent
Perlmutter et al.

(10) Patent No.: US 6,965,491 B1
(45) Date of Patent: Nov. 15, 2005

(54) METHOD TO CORRECT RADIAL MISPOSITION OF DATA TRACKS

(75) Inventors: Stephen Perlmutter, Lafayette, CO (US); Thomas Melrose, Longmont, CO (US); James Hargarten, Lafayette, CO (US); Don Brunnett, Pleasanton, CA (US); Lloyd Levy, San Jose, CA (US); Adrián Cerdá, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 137 days.

(21) Appl. No.: 10/174,484

(22) Filed: Jun. 18, 2002

Related U.S. Application Data

(60) Provisional application No. 60/299,140, filed on Jun. 18, 2001.

(51) Int. Cl.[7] .............................................. G11B 5/596
(52) U.S. Cl. .................................................. 360/77.04
(58) Field of Search .............................. 360/77.04, 75, 360/77.02, 77.08

(56) References Cited

U.S. PATENT DOCUMENTS

| | | | | |
|---|---|---|---|---|
| 6,411,461 B1 * | 6/2002 | Szita | ....................... | 360/77.04 |
| 6,608,731 B2 * | 8/2003 | Szita | ......................... | 360/75 |
| 6,624,963 B2 * | 9/2003 | Szita | ....................... | 360/77.04 |
| 6,654,198 B2 * | 11/2003 | Liu et al. | ................ | 360/77.04 |
| 6,714,376 B1 * | 3/2004 | Brunnett et al. | .............. | 360/75 |
| 6,751,042 B2 * | 6/2004 | Bi et al. | ...................... | 360/75 |
| 6,785,084 B2 * | 8/2004 | Szita | ....................... | 360/77.04 |

\* cited by examiner

*Primary Examiner*—David Hudspeth
*Assistant Examiner*—James L Habermehl
(74) *Attorney, Agent, or Firm*—Tejpal S. Hansra

(57) ABSTRACT

A disk drive measures the radial misposition of tracks and repositions the tracks at regularly spaced intervals. Written in runout (WRO) in servo bursts is determined to calculate track spacing and squeeze among adjacent tracks. Tracks with improper spacing are repositioned by adding a squeeze correction term to the servo wedges. Thereafter, when the disk drive operates to store data, the servo bursts are used to calculate a position error signal (PES), and the squeeze correction term is combined with the PES to position the head at a proper track radius.

62 Claims, 16 Drawing Sheets

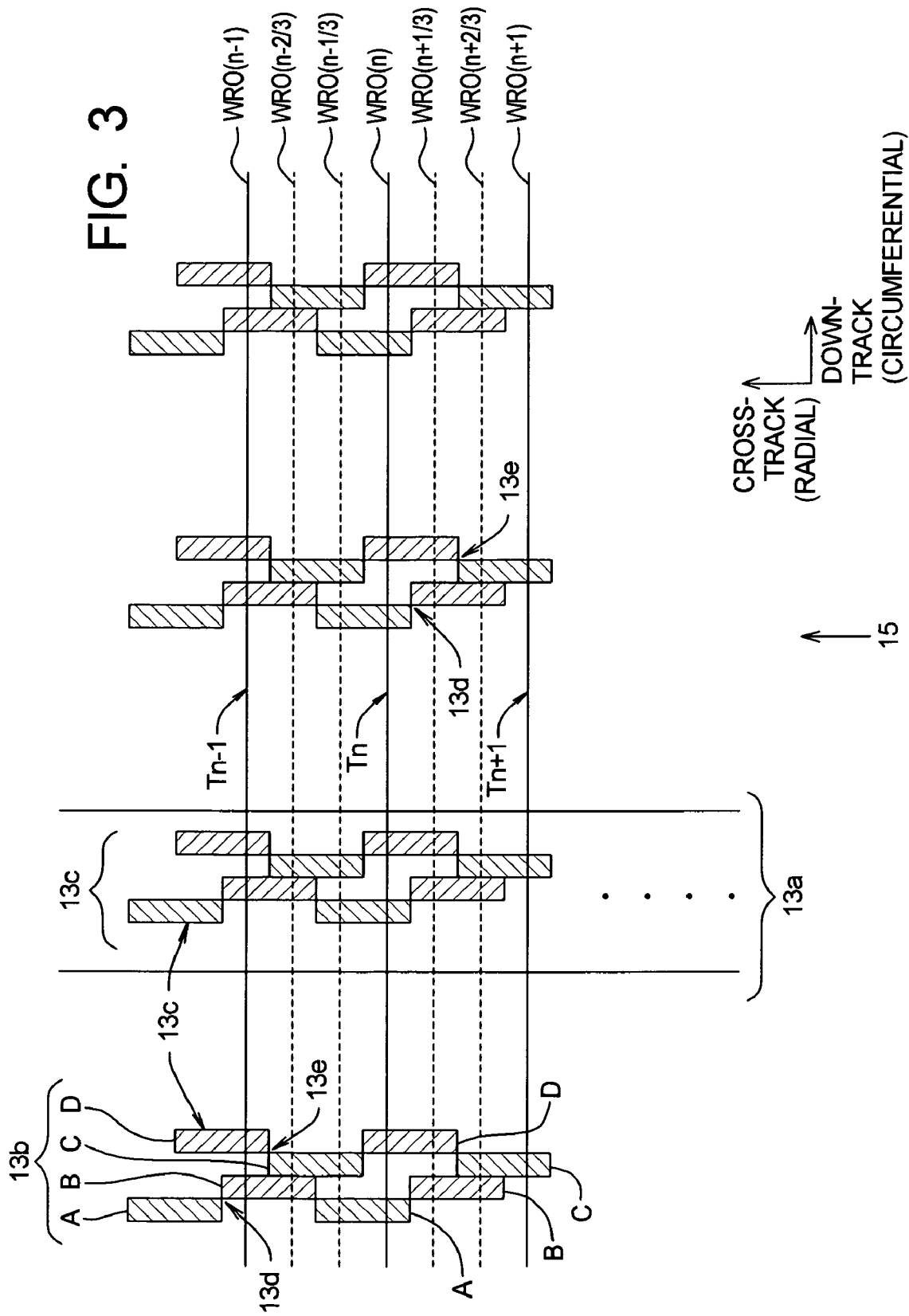

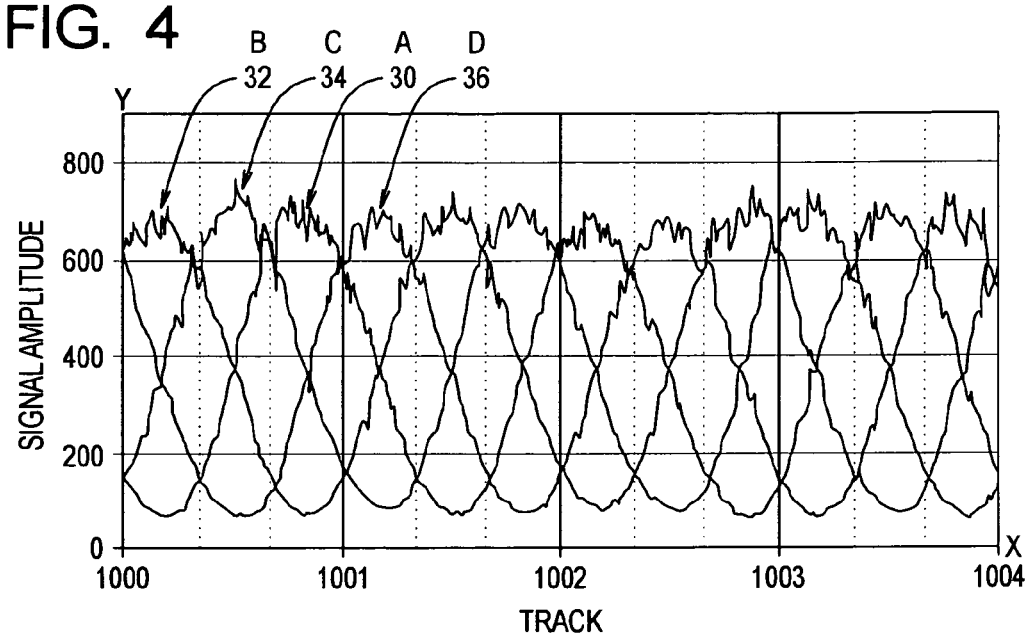

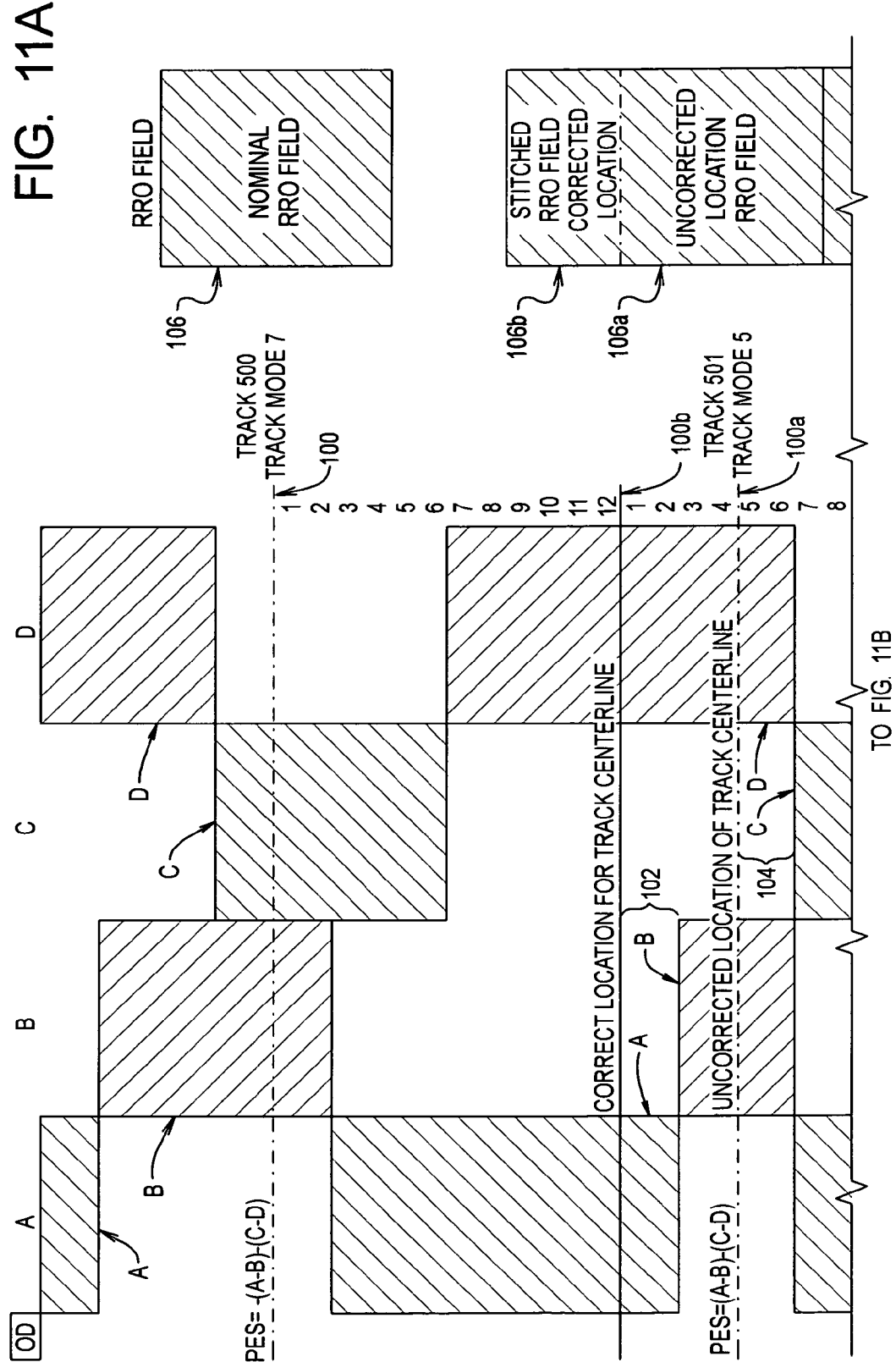

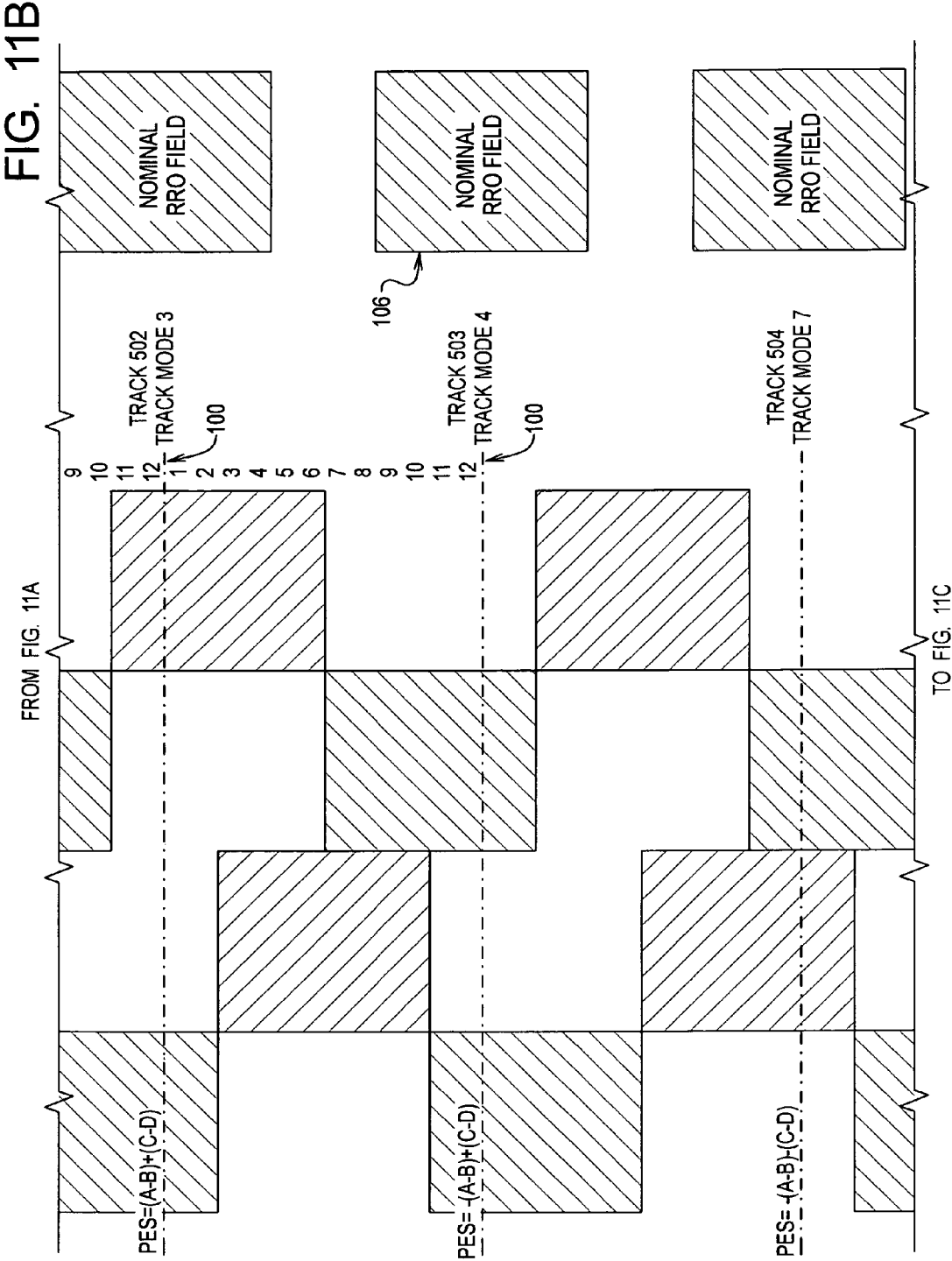

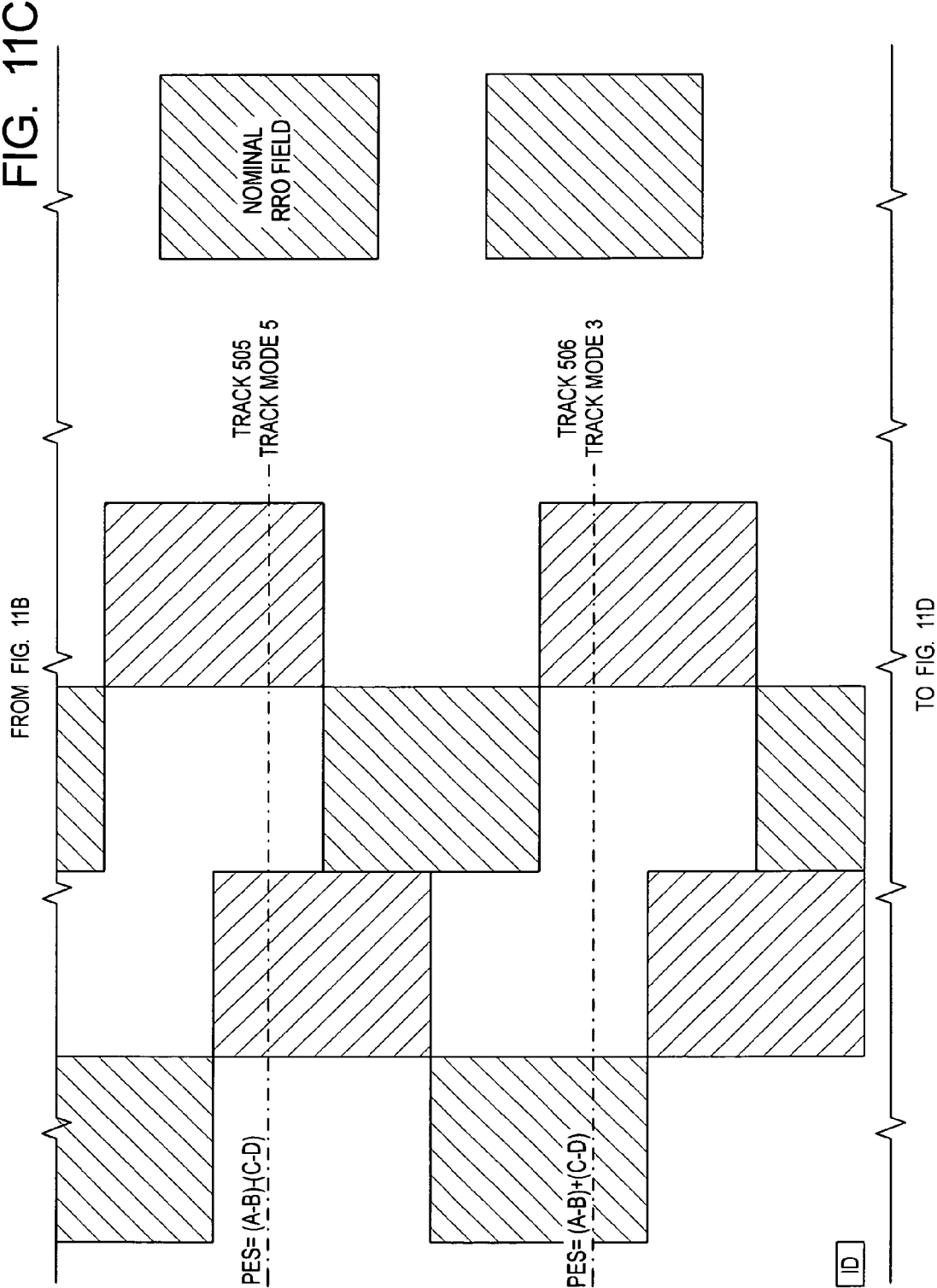

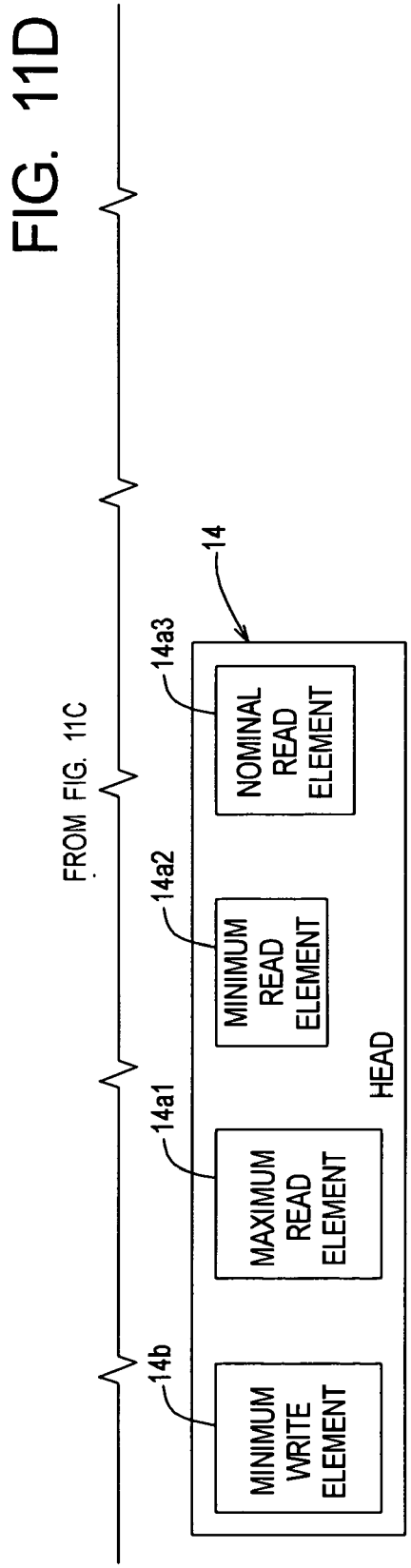

METHOD TO CORRECT RADIAL MISPOSITION OF DATA TRACKS

RELATED APPLICATIONS

This application claims priority from U.S. Provisional Application No. 60/299,140 filed on Jun. 18, 2001, entitled "Method to Correct Radial Misposition of Data Tracks", which is incorporated herein by reference.

FIELD OF THE INVENTION

The present invention relates in general to data storage, and in particular to improving data storage reliability and efficacy in a disk drive.

BACKGROUND OF THE INVENTION

Disk drives are well known in the computer art for providing secondary mass storage with random access. A disk drive comprises one or more magnetic data storage disks rotated on a spindle by a spindle motor within an enclosed housing. A magnetic transducer head is placed on an actuator arm and positioned very closely to a corresponding disk surface by a slider suspended upon an air bearing. Servo information is typically written in servo sectors which are interleaved between data sectors or blocks. Servo information provides a servo controller with head position information to enable a head positioner, such as a rotary voice coil motor (VCM), to move the actuator arm and therefore the head from track-to-track during random access track seeking operations, and to maintain the head in proper alignment with a track centerline during track following operations when user data is written to or read from the available data sectors of the disk surface. As such, the servo controller controls head positioning as the head is moved transversely across the tracks by the actuator arm, and maintains the head over a particular track as the disk spins. The servo controller also controls the acceleration of the head which results from a force supplied by the VCM to the actuator arm.

The servo controller receives head position readings from the head. The head position is determined from the servo information written directly onto the disk by e.g. a servo writer as part of the manufacturing process. The servo information may include the track number and indicate how far the head is from the track centerline. That is, certain information on each track is reserved for indicating head position. As the head passes over the servo information, the track identification and position indicators are read by the head and supplied to the servo controller. The position indicators are at regularly spaced locations. Thus, the servo controller input from the head is not continuous but is sampled.

The servo writer is typically stabilized on a large granite base to minimize unwanted vibration and employs an encoder (e.g. laser interferometry) for position measurements. The servo writer supplies power to the spindle motor for rotating the disk. The servo writer may include a fixed head for writing a clock track onto one disk surface. The servo writer may also include a positioning system for moving a push-pin which extends through an opening in the disk drive housing and mechanically contacts the actuator arm. The positioning system uses the push-pin to move the actuator arm and the head radially across the disk, and the head writes the track address and the servo information at several specified locations called servo wedges that extend radially across the tracks. The servo wedges provide servo sectors for each track on the disk.

The servo writer attempts to write the servo information in circular tracks that are evenly spaced across the disk surface. However, because of mechanical and electrical limitations, it not possible to obtain even track spacing. This track mispositioning is referred to as "squeeze" which limits the off-track read capability (OTRC) of the disk drive and can cause encroachment (overwrite) leading to data loss. Existing methods of correcting squeeze and encroachment are not effective when two adjacent tracks are radially positioned too close to or too far from one another.

This problem is increasingly significant as track densities (measured in tracks-per-inch (TPI)) are increased. Increased TPI makes track spacing errors and the resulting squeeze more significant to data integrity. Existing methods of detecting squeeze include detecting data corruption due to encroachment. For example, during disk drive manufacturing, a flaw scan test identifies the disk locations which do not provide reliable read and write operations. These disk locations are logged within the disk drive and mapped out of the available customer data area. However, such techniques are time consuming and expensive.

There is, therefore, a need to efficiently detect squeeze during disk drive manufacturing. There is also a need for correcting squeeze in order to prevent encroachment and degradation in the OTRC of the disk drive.

BRIEF SUMMARY OF THE INVENTION

The present invention satisfies these needs. In one embodiment, the present invention measures the radial misposition of the tracks and repositions the tracks at regularly spaced intervals. This allows for higher track densities and consequently higher capacity disk drives. In a first step, written in runout (WRO) in servo pattern bursts written by a servo writer is measured and used to calculate track spacing and squeeze among adjacent tracks. In one implementation, for each track, the WRO per servo wedge is determined based on a combination of servo bursts at different radial distances from the track centerline in different disk revolutions. The measured WROs of the track servo wedges are combined to obtain a squeeze value for the track relative to an adjacent track. The squeeze value indicates whether the track is properly radially positioned.

The tracks with improper spacing, indicating they are radially mispositioned (squeeze), are identified and effectively repositioned by adding a squeeze correction term to specific fields in the servo wedges of the tracks to correct for the squeeze. Thereafter, when the disk drive is operating, the servo bursts are used to calculate a position error signal (PES), and the squeeze correction term in the servo fields is combined with the PES to obtain an adjusted PES to position the head such that the reading/writing takes place at a proper track radius. This tells the servo controller how to position the head to write at an adjusted track location (radius) that prevents squeeze.

In another version of the present invention, sectors of a track that are radially misplaced (squeeze) are identified, are logged within the disk drive, and are mapped out of the available customer data area. Thereafter, the disk drive does not use the mapped out sectors for data transfer.

The present invention efficiently detects track spacing and squeeze during disk drive manufacturing. Further, the present invention corrects radial position of tracks with improper spacing, or maps out sectors with improper spacing, in order to prevent encroachment and degradation in the OTRC of the disk drive.

BRIEF DESCRIPTION OF THE DRAWINGS

These and other features, aspects and advantages of the present invention will become understood with reference to the following description, appended claims and accompanying figures where:

FIG. 3 shows example servo bursts in servo wedges of the servo pattern in FIG. 2;

FIG. 4 shows sample plots of a readback signal for the servo bursts in FIG. 3;

FIGS. 11A–D collectively show an example burst placement and RRO fields for several tracks including RRO field stitching.

Like reference symbols and characters refer to like elements.

DETAILED DESCRIPTION OF THE INVENTION

Figure 1:
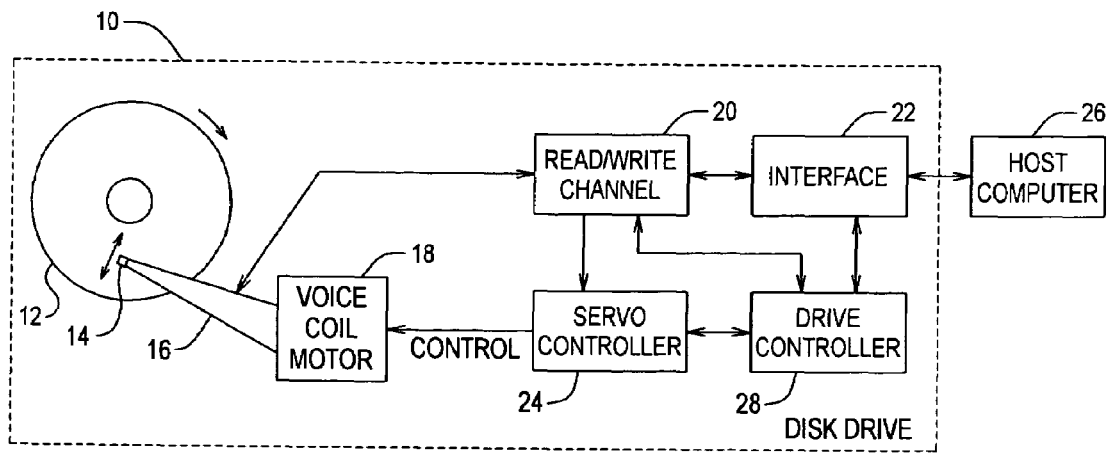
FIG. 1 shows a diagrammatic example of a disk drive in which the present invention can be implemented.

FIG. 1 is a block diagram illustrating a disk drive 10 in which the present invention can be implemented. The disk drive 10 can be coupled to an external host computer 26 that uses the disk drive 10 as a mass storage device. The disk drive 10 includes functional blocks that do not necessarily represent discrete hardware elements. For example, two or more of the functional blocks can be implemented in firmware in a common digital processor.

The disk drive 10 includes a data storage disk 12, a transducer head 14, an actuator arm 16, a voice coil motor (VCM) 18, a read/write channel 20, an interface 22, a servo controller 24 and a drive controller 28.

The disk drive 10 receives read and/or write requests from the host computer 26 and carries out the requests by performing data transfers between the disk 12 and the host computer 26. In a preferred embodiment, the disk drive 10 includes multiple disks 12 in a vertical stack with one head 14 for each operative disk surface. Typically, both surfaces of each disk 12 will be operative for storing user data and the disk drive 10 will include two heads 14 for each disk 12. Single-sided disk arrangements can also be used.

The interface 22 provides an interface between the disk drive 10 and the host computer 26. During read and write operations, the interface 22 provides a communications path that includes data buffering between the host computer 26 and the channel 20. In addition, the interface 22 receives commands and requests from the host computer 26 and directs them to the drive controller 28. The drive controller 28 then carries out the commands by appropriately controlling the elements within the disk drive 10.

The VCM 18 controllably positions the head 14 with respect to its corresponding disk surface in response to a control signal generated by the servo controller 24. The head 14 is coupled to the actuator arm 16 and moves under the influence of the VCM 18. When performing a read or write operation, the drive controller 28 instructs the servo controller 24 to move the head 14 to a target track on the disk 12 so that a data transfer can take place. The servo controller 24 then generates a control signal to move the head 14 from a present location to the indicated target track during a seek operation.

Once the head 14 has arrived at the target track, the servo controller 24 enters a track follow mode and maintains the head 14 in a substantially centered position above the target track. The bulk of the data transfer between the head 14 and the target track occurs during the track follow mode.

The channel 20 performs the data transformations necessary to provide communication between the host computer 26 and the disk 12. For example, during a write operation, the channel 20 converts digital data received from the host computer 26 into an analog write current for the head 14. During a read operation, the channel 20 provides the data transformations necessary for converting an analog read signal received from the head 14 into digital data that can be recognized by the host computer 26. The channel 20 also separates out servo information read by the head 14 and directs the servo information to the servo controller 24 for positioning the head 14.

Figure 2:
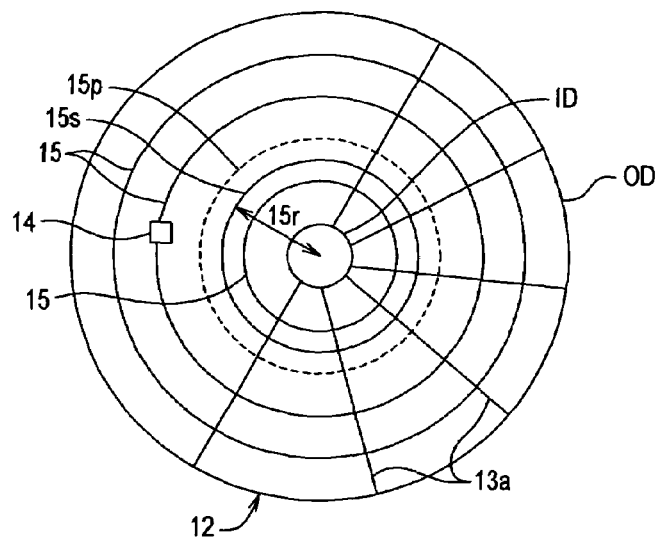
FIG. 2 shows a diagrammatic example of a disk with several concentric tracks and a servo pattern.

FIG. 2 shows the disk 12 with tracks 15 positioned from the inner diameter (ID) to the outer diameter (OD) of the disk 12, and the head 14 positioned over a track 15. After the disk drive 10 is assembled and servo written, during a flaw scan test in the manufacturing process the spacing of the tracks 15 is detected, and if the spacing of a track 15 relative to the adjacent tracks 15 is not within a desirable range (squeeze) then each improperly spaced track 15, or each improperly spaced sector of a track 15, is mapped out or repositioned. By separately measuring the track spacing, the marginal tracks 15 can be detected independently of the performance of the head 14.

In one version of the present invention, the tracks 15 that are improperly spaced (exhibit squeeze) are identified and mapped out of the customer data storage area. The improperly spaced tracks 15 and sectors are logged and entered into a defect map of the disk drive 10. In another version, the tracks 15 that are improperly spaced are identified and repositioned for proper spacing to obtain concentric tracks 15 at spaced intervals without squeeze (essentially regularly spaced intervals without squeeze).

In either case, detecting the track spacing uses a combination of servo bursts. As shown in FIG. 2, an improperly spaced or squeeze track 15s can include DC squeeze where the radius 15r of the track 15s is too small or too large in relation to the adjacent tracks 15, leading to unevenly spaced tracks 15 on the surface of the disk 12. The radius of the track 15s is too small, and the proper position of the track 15s is shown by the dotted circle 15p.

The track 15 can also include AC squeeze where only portions (e.g., sectors) of the track 15 are written with improper spacing in relation to the adjacent tracks 15 such that the track 15 is perturbed from a circular shape but the average radial position of the track 15 is essentially correct. The present invention determines both the DC squeeze and the AC squeeze.

Referring to FIGS. 2 and 3, the servo information includes servo burst patterns 13c in servo wedges 13a that form essentially radial servo spokes around the disk 12. Although the disk 12 is illustrated as having a relatively small number of the tracks 15 and the servo wedges 13a, it can be appreciated that a typical disk includes a very large number of tracks and servo wedges.

FIG. 3 illustrates portions of the tracks 15 laid out linearly in a down-track 9 (circumferential) direction from left to right, and in a cross-track (radial) direction from top to bottom. Three centerlines Tn−1, Tn and Tn+1 of three tracks 15 are defined by multiple servo wedges 13a on each track 15. Each servo wedge 13a begins with digital information (e.g., AGC, sync mark, gray code, etc.) (not shown) and circumferentially sequential, radially offset servo bursts 13c which provide analog information to the servo controller 24 for positioning the head 14. In this example, in each servo wedge 13a, the servo bursts 13c are four staggered A, B, C and D bursts. The servo wedge 13a can include further information following the servo bursts 13c as described below. Other numbers of servo bursts and offset configurations are also possible. In this example, the A, B bursts form a burst pair and the C, D bursts form another burst pair. The AC squeeze and the DC squeeze are not to be confused with the A, B, C and D bursts or the burst seams thereof.

During servo writing, the head 14 is positioned to write the A burst, then the head 14 is moved by ⅔ track width to write the B burst in a next revolution of the disk 12, thereby trimming off the bottom edge of the A burst and defining a burst seam (transition) 13d between the A burst and the B burst. Thus, the A burst is written in a first revolution of the disk 12, and then the A burst is trimmed when writing the B burst in a second revolution of the disk 12, thereby creating position information in the second revolution of the disk 12 by the trim/write operation. A different pair of revolutions of the disk 12 create the position information for the C, D burst pair. The C burst is written first, and then in a different revolution of the disk 12 the D burst is written, thereby trimming the edge of the C burst and forming another burst seam 13e between the C burst and the D burst. As such, in a pair of revolutions of the disk 12 the A, B burst pair and the burst seam 13d are written, and in a different pair of revolutions of the disk 12 the C, D burst pair and the burst seam 13e are written.

The motion of the head 14 from the servo writer defines where the burst seams 13d and 13e occur. Since the head 14 has non-repeatable motion, the difference in position for the burst seam 13d and the burst seam 13e captures the non-repeatable runout (NRRO) written into the A, B and C, D burst pairs as the AC squeeze. Therefore, NRRO is captured/ written during servo writing and is different from revolution-to-revolution of the disk 12, and the burst seams 13d and 13e are written with the AC squeeze.

If the head 14 is placed at the burst seam 13d, the readback signal of the head 14 includes half the signal value of the A burst and half the signal value of the B burst. If the head 14 is shifted towards the A burst, the magnitude of the A burst readback signal increases and the magnitude of the B burst readback signal decreases, thereby providing the head 14 position information. The same readback signals and position information apply to the C, D burst pair. The A, B and C, D burst pairs are shifted in position from each other by a fraction of the track width, such as ⅓ track width in this example.

FIG. 4 shows sample readback signal plots 30, 32, 34 and 36 for the A, B, C, D bursts, respectively. The horizontal axis (X) indicates the radial track position and the vertical axis (Y) indicates the signal amplitude. In the description herein, the servo bursts and the servo burst readback signals are used interchangeably. As shown in FIG. 4, near track 1001 all the burst signals are in their linear range and the signal values |A−B|=|C−D|. At this track position, the four burst combination determines the head 14 position. For the head 14 positioning, in one example, the signal value from the flux transitions in the servo bursts induced to the head 14 are decoded by demodulating the induced head signals to form difference values (difference signals) including the A−B and C−D phases. The head 14 position information is decoded by using combinations of the A−B burst phase and the C−D burst phase depending on the radial (cross-track) location of the head 14 relative to the track centerline. The difference signals can be used in combination to obtain a PES for positioning the head 14 by the servo controller 24. The PES represents the linear portions of the difference signals indicating the direction of the head 14 movement for maintaining the head 14 at the desired track position (e.g., at a track centerline, 0.25 width from a track centerline, between two track centerlines, etc.).

The channel 20 includes a servo burst signal value detector circuit (not shown) which sequentially samples and holds analog burst signal values read from the A, B, C and D bursts by the read element of the head 14. The detector circuit extracts the signal values (e.g., peak signal values) of the A, B, C and D bursts read from each servo sector. The burst signal values are used to generate the PES. The servo controller 24 reads the PES and computes a new control setting after each servo sector to drive the actuator arm 16 in a direction that reduces the PES. Other methods in addition to peak detection include a discrete fourier transform (DFT) and are known by those skilled in the art.

The AC and DC squeeze values are functions of the WRO when the servo bursts were written by the servo writer. Therefore, to determine the squeeze, the track WRO is measured and the squeeze is determined based on the WRO.

A version of measuring track spacing and squeeze between tracks based on WRO involves combining the signal values of the servo bursts in an orthogonal manner compared to the way they are combined for the PES. The servo burst signal value combinations for the PES are proximate to the track centerline where the servo bursts yield a signal with high slope providing high sensitivity when the head 14 strays from the track centerline. The orthogonal combination signal of the burst signal values representing the WRO is the converse of the PES and insensitive to the head 14 stray. However, the WRO signal is very sensitive to track spacing and therefore is a good indication of squeeze. Comparing the WRO of a track to that of other tracks indicates whether the track's spacing (relative to the adjacent tracks) is higher or lower than average. A higher or lower than average WRO indicates squeeze.

Figure 5A:
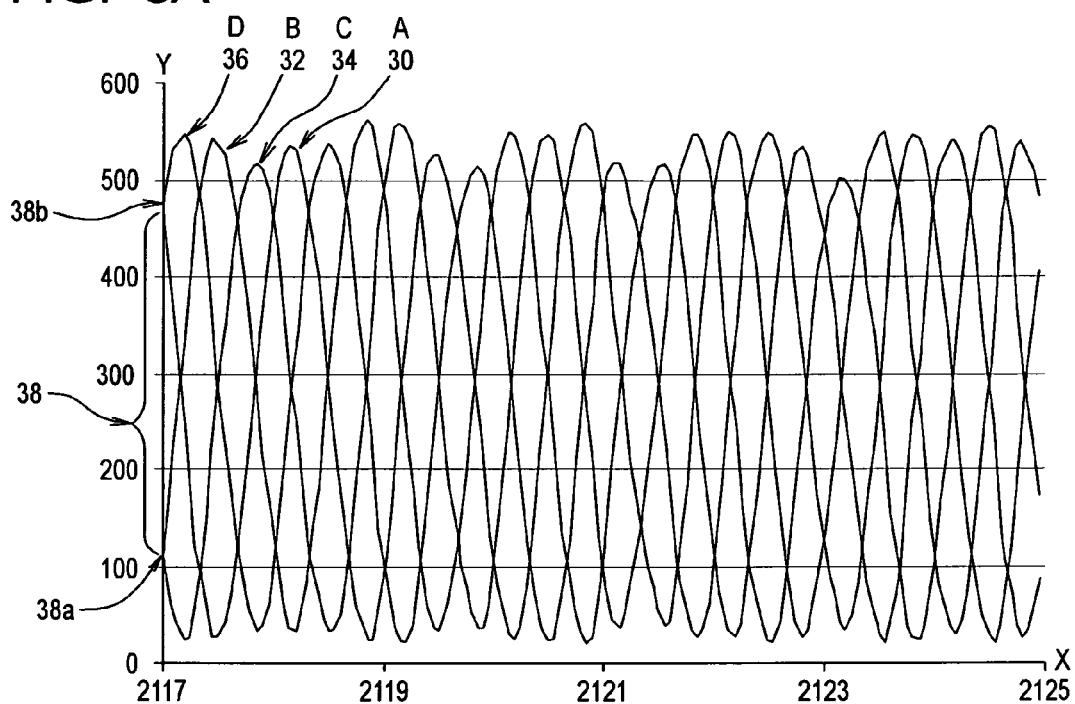
FIG. 5A shows example burst signal value plots for the servo bursts of a track with proper track spacing (no squeeze)

FIG. 5A illustrates burst signals 30, 32, 34, 36 of the A, B, C and D bursts, respectively, with the radial track position on the horizontal axis (X) and the signal amplitude on the vertical axis (Y), for a track without squeeze (e.g., normal A, B, C, D bursts, averaged over multiple revolutions of the disk 12). At locations where the A, B, C and D bursts are active, the relative burst signal cross-over distance 38 is proportional to the track spacing. The cross-over distance 38 is the vertical distance between two burst cross-overs. For track 2117, there is a B, C cross-over (intersection 38a) near burst signal value 110 and a A, D cross-over (intersection 38b) near burst signal value 475. In FIG. 5A, the track spacing for tracks 2117 to 2125 is essentially uniform and without squeeze.

Figure 5B:
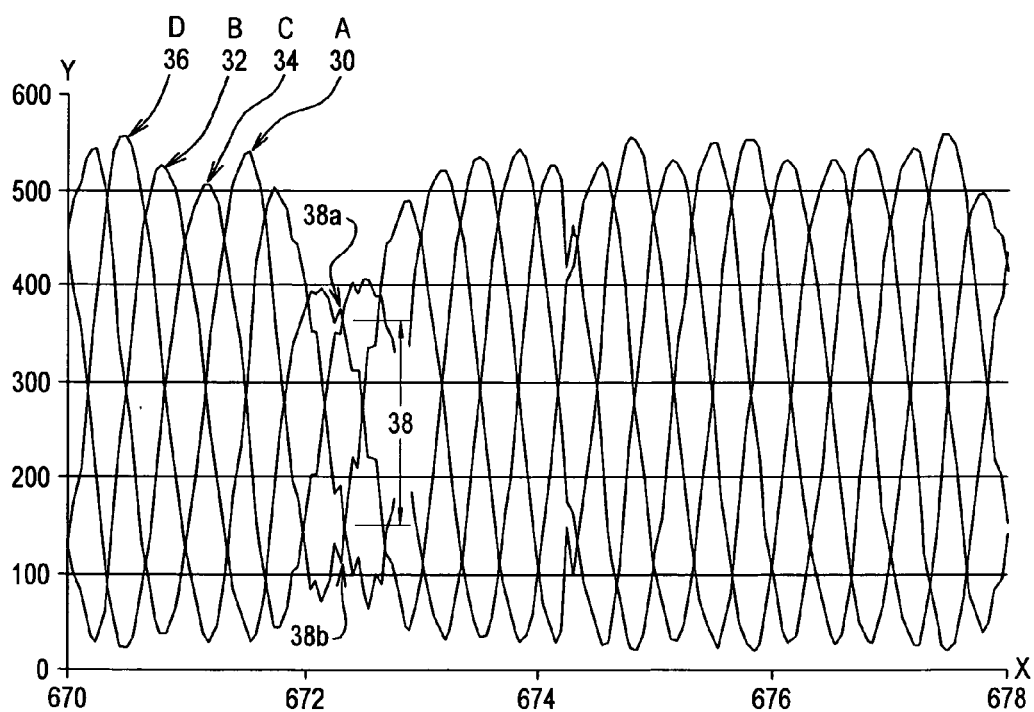
FIG. 5B shows example burst signal value plots for the servo bursts of a track with improper track spacing (squeeze)

FIG. 5B illustrates burst signals 30, 32, 34, 36 of the A, B, C and D bursts, respectively, with the radial track position on the horizontal axis (X) and the signal amplitude on the vertical axis (Y), for a track with squeeze. Track 672 shows reduction in the cross-over distance 38 between the intersections 38a and 38b of the B, C and A, D burst signal pairs, respectively, relative to the other cross-over distances 38. The reduction in the cross-over distance 38 at track 672 indicates the WRO is outside the average WRO for track 672. Thus, track 672 is a squeeze track.

To determine squeeze for a track 15, the WRO for each servo wedge 13a in the track 15 is determined at multiple positions (e.g., the track centerline, and ⅓ and ⅔ track width positions relative to the track centerline). Preferably the WRO measurement is essentially performed at every track location where a valid position measurement can be obtained. In this example, the track centerlines are selected at new norm/quad positions using the A, B, C and D bursts, and when the head 14 is positioned on a track centerline the servo controller 24 drives |A−B|=|C−D| regardless of the values of |A−B| or |C−D|.

If within a given range of the tracks 15 the written track width is essentially constant and the track spacing is uniform as shown in FIG. 5A, then the value |A−B| should be essentially constant over each track 15 at the signal crossovers. Similarly the value |C−D| should be essentially constant over each track 15 at the signal cross-overs. As shown in FIG. 5B, reduced track spacing reduces the values |A−B| and |C−D| in the servo wedge 13a at the signal cross-overs relative to other tracks 15.

In generating the PES, depending on the head 14 location relative to the track centerline, different track modes based on combinations of the burst difference values are used. Determining the PES and the corresponding WRO based on the track mode for the four burst servo pattern is based on the following relations:

| | | |
|---|---|---|
| PES1 = f[(A − B) − (C − D)] | (1a) |
| WRO1 = f[(A − B) + (C − D)] | (1b) |
| PES2 = f[−(A − B) − (C − D)] | (2a) |
| WRO2 = f[(A − B) − (C − D)] | (2b) |
| PES3 = f[−(A − B) + (C − D)] | (3a) |
| WRO3 = f[−(A − B) − (C − D)] | (3b) |
| PES4 = f[(A − B) + (C − D)] | (4a) |
| WRO4 = f[−(A − B) + (C − D)] | (4b) | where each PES and corresponding WRO is a function (f) of combinations of the A−B and C−D values.

Referring back to FIG. 3, in the above relations, PES1 and WRO1 correspond to the head 14 position at a track centerline (e.g., Tn−1). PES2 and WRO2 correspond to the head 14 position at ⅓ track width from the track centerline. PES3 and WRO3 correspond to the head 14 position at ⅔ track width from the track centerline. And, PES4 and WRO4 correspond to the head 14 position at the adjacent track centerline (e.g., Tn).

Figure 6A:
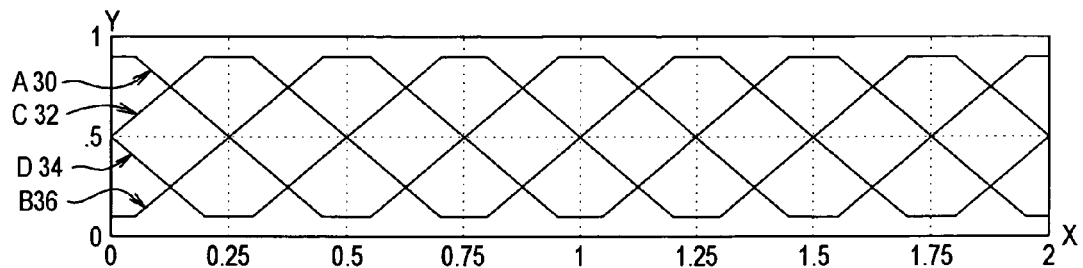
FIG. 6A shows other example burst signal value plots for the servo bursts of a track with proper track spacing.

FIGS. 6A−6C and 7A−7C shows additional plots in which the horizontal axis (X) indicates the radial track position and the vertical axis (Y) indicates the signal amplitude.

Figure 6B:
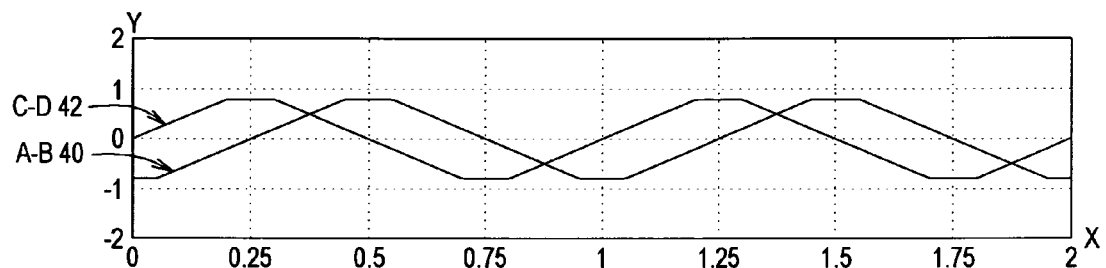
FIG. 6B shows example burst difference signal value plots for the servo bursts of FIG. 6A.
Figure 6C:
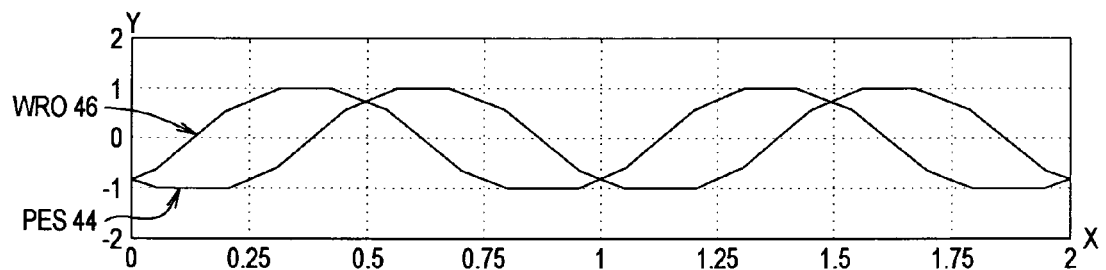
FIG. 6C shows example signal value plots for the PES and WRO for the servo bursts of FIG. 6B.

FIG. 6A shows plots of the signal values for the A, B, C and D bursts for a track without squeeze. FIG. 6B shows plots of the burst difference values A−B and C−D, designated as 40 and 42, respectively. FIG. 6C shows plots of PES=[(A−B)−(C−D)]g and WRO=[(A−B)+(C−D)]g, designated as 44 and 46, respectively. In one example, g is a constant determined by a linearizer algorithm (there are different values of two-burst and four-burst calculations).

Figure 7A:
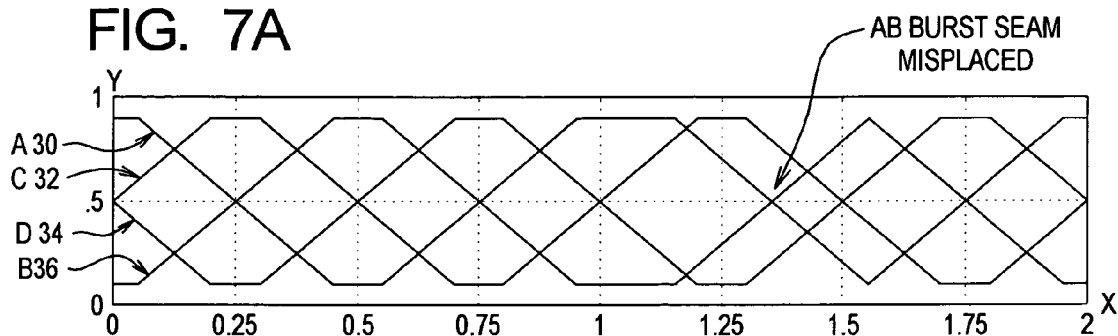
FIG. 7A shows other example burst signal value plots for the servo bursts of a track with improper track spacing.
Figure 7B:
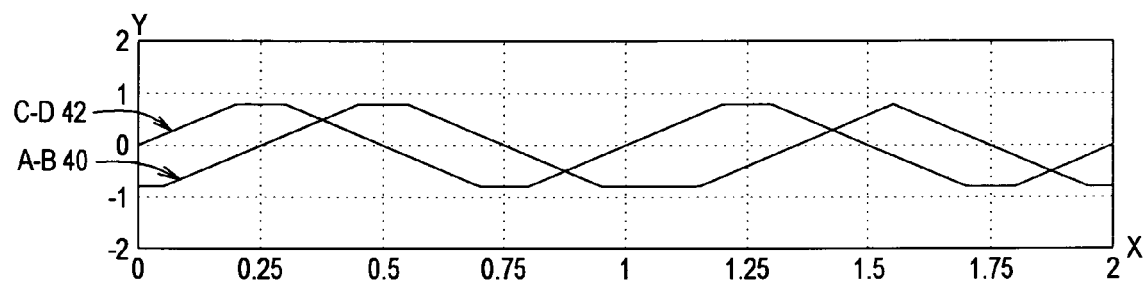
FIG. 7B shows example burst difference signal value plots for the servo bursts of FIG. 7A.
Figure 7C:
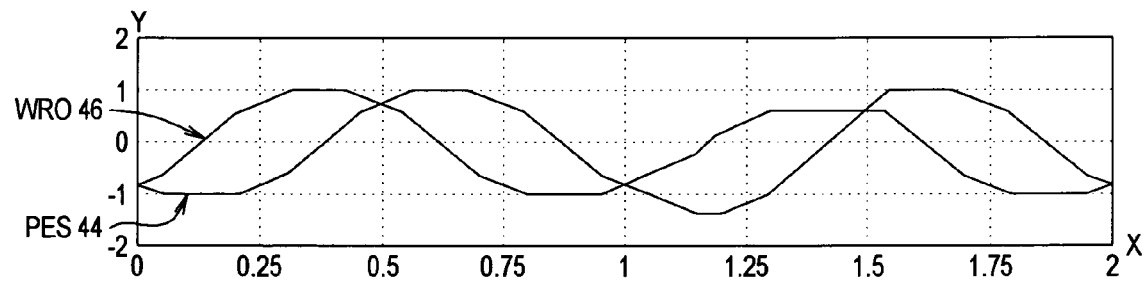
FIG. 7C shows example signal value plots for the PES and WRO for the servo bursts of FIG. 7B.

FIG. 7A shows plots of the signal values for the A, B, C and D bursts for a track with squeeze. The track has squeeze since the burst seam 13d (between the A and B bursts) is misplaced by 10% track width. FIG. 7B shows plots of the corresponding burst difference values A−B and C−D, designated as 40 and 42, respectively. FIG. 7C shows plots of the corresponding PES=[(A−B)−(C−D)]g and WRO= [(A−B)+(C−D)]g. In FIG. 6C the nominal and acceptable WRO is 1.0 for a track without squeeze, whereas in FIG. 7C the shifted position of the burst seam 13d causes the WRO to drop from 1.0 to 0.8, indicating squeeze. For simplicity of explanation, the constant g is not used in portions of the following description.

In one implementation, the DC squeeze (SQDC) can be determined based on 4 WRO measurements as follows:

$$SQDC = f[WRO1 + 2WRO2 + 2WRO3 + WRO4] \quad (5)$$

Referring back to FIG. 5B, to determine the DC squeeze between track 672 and the adjacent track 673, WRO1 is measured at track 672, WRO2 is measured at track 672 plus ⅓ track width, WRO3 is measured at track 672 plus ⅔ track width, and WRO4 is measured at track 673. WRO is measured for all the servo wedges 13a of tracks 672 and 673, and each servo wedge 13a requires measurements at ⅓ track steps between tracks 672 and 673. Relation 5 is for a 3:1 servo pattern (i.e., three servo track writer steps per track, as shown in FIG. 3). Other servo patterns (e.g., 2:1) are variations on Relation 5 according to the present invention. Therefore, the scope of the present invention is not limited to the example 3:1 servo pattern, the A, B, C and D bursts and the WRO and PES and squeeze relations described herein. As those skilled in the art will recognize, the present invention is useful with servo patterns having different burst numbers and burst placements than the four burst example.

Preferably, to determine the DC squeeze of a track 15, the WRO values for each servo wedge 13a in the track 15 are averaged. There is an offset in the WRO measurement which is common to the tracks 15, represented as WRO_AVE. The absolute value of the WRO signal value depends on the disk 12, the head 14 and the disk drive 10 electronics (e.g., channel 20, controllers 24 and 28, etc.), and as a result it is averaged as WRO_AVE. In one example, WRO_AVE is determined over many tracks 15 as a tracking weighted average of the measured cross-over distances 38 (FIGS. 5A–5B) obtained by a moving average. At every measurement location a new WRO value is obtained, and the WRO value is compared to a spacing threshold range. If the WRO value is within the threshold range then the track spacing is acceptable and the WRO value is included in the moving average. If the WRO value is not within the threshold range (indicating squeeze such as at track 672) then that squeeze location is logged and the WRO value is not included in the moving average. WRO_AVE is subtracted in the example DC squeeze calculation as follows:

$$SQDC=(WRO1-WRO\_AVE)+2(WRO2-WRO\_AVE)\\+2(WRO3-WRO\_AVE)+(WRO4-WRO\_AVE) \quad (6)$$

At each servo wedge 13a, the burst seams 13d and 13e are used to determine the corresponding WRO value described above. In one version of the present invention, the DC squeeze is the average value of the runout in all the servo wedges 13a of a track 15.

Returning to the above example, to determine squeeze for track 672, the WRO measurements are retained in memory for all 256 servo wedges 13a around the track 672. The WRO measurements are made and retained for track 672, track 672 plus 1/3 track width, track 672 plus 2/3 track width, and track 673. Then the squeeze calculation above is performed over all the servo wedges 13a of track 672, and the squeeze values are averaged to obtain the average squeeze for track 672. In each servo wedge 13a, the WRO for each burst seam is determined, and then Relation 6 is used to obtain the DC squeeze for the servo wedges 13a. The SQDC values are averaged over all the servo wedges 13a around track 672 to provide an averaged value (a squeeze correction term that may be a constant).

The squeeze correction term is written into an RRO field following the bursts 13c in each servo wedge 13a of track 672 to correct for squeeze. In one example, one RRO field corresponds to the read position of the head 14 and another RRO field corresponds to the write position of the head 14. When the disk drive 10 is operating, the servo bursts 13c are used to calculate the PES, and the squeeze correction term in the RRO field is combined with the PES to obtain an adjusted PES for the servo controller 24 to position the head 14 such that reading/writing takes place at a proper track radius (essentially without squeeze). As a result, the servo controller 24 positions the head 14 to write at an adjusted track location (radius) that prevents squeeze.

Referring back to FIG. 2, the squeeze correction terms are written into the RRO fields in the servo wedges 13a of the squeeze track 15s. During the disk drive 10 operation, the servo controller 24 uses the squeeze correction terms in the RRO fields to position the head 14 at a greater (or smaller) radius, and consequently effectively radially repositions the track 15s to the radial location at the dotted circle 15p to be essentially evenly spaced in relation to the adjacent tracks 15 without squeeze.

As such, a squeeze track can be repositioned. The track radius can be decreased or increased towards the ID or OD, respectively, of the disk 12 up to e.g. about 15 to 20% track width, depending on the squeeze correction terms placed into the RRO fields. Each RRO field may include other correction terms, such as embedded runout correction terms and AC squeeze correction terms, for circularizing a track 15 which includes perturbations (squeeze sectors) but has a generally proper average radius.

Figure 8A:
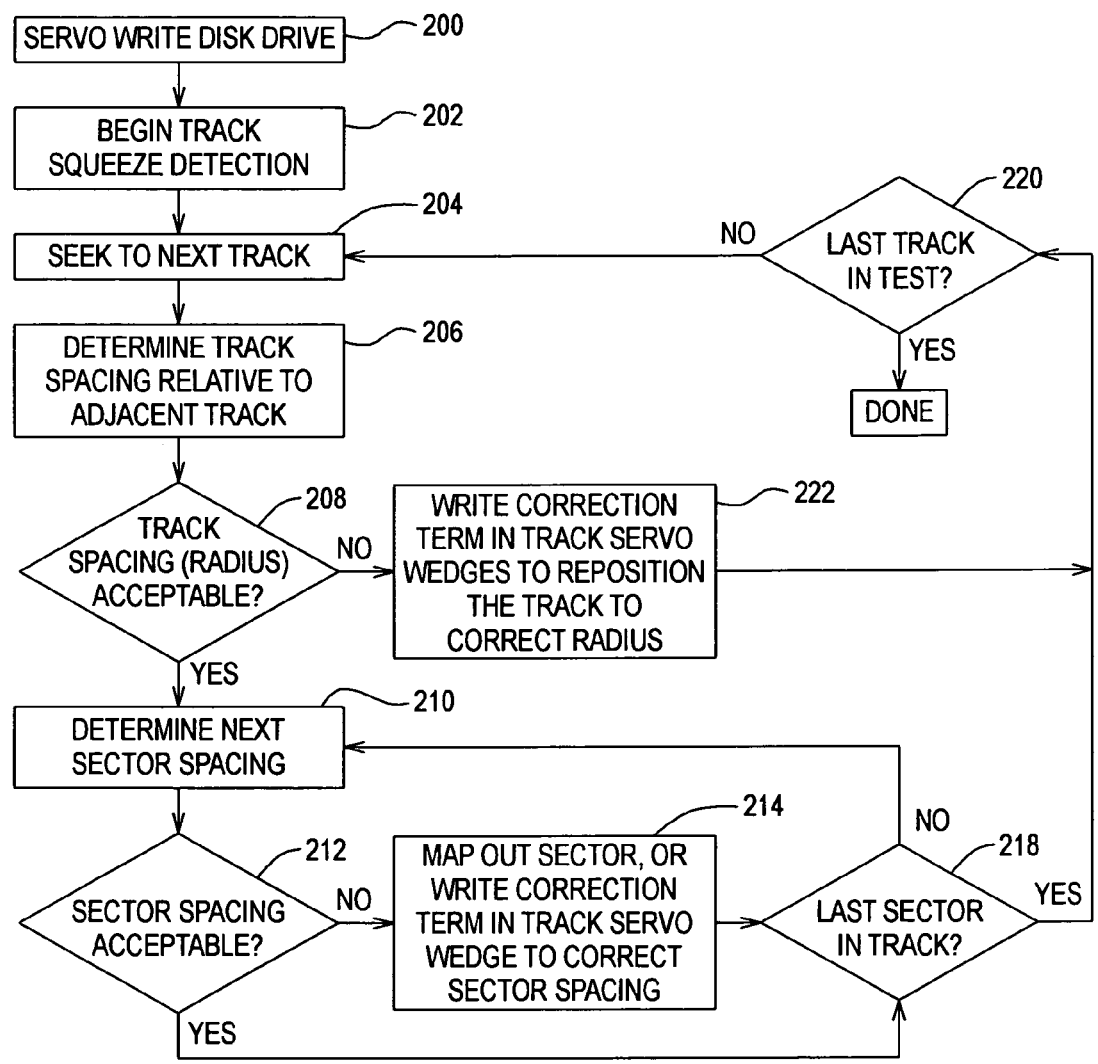
FIG. 8A shows an example flowchart of track spacing measurement and correction.

FIG. 8A shows a flowchart of a track spacing measurement and correction process. After the disk drive 10 is assembled and servo written (step 200), a track spacing measurement to detect squeeze is commenced (step 202). The servo controller 24 seeks to a next track 15 and determines if the track 15 can be followed (the servo controller 24 can remain within a track follow window for several sectors) (step 204). If the track 15 can be followed, then the track spacing relative to an adjacent track 15 is measured (step 206). The track spacing is used to determine whether the entire track 15 includes squeeze (DC squeeze) such that the track spacing (radius) is too small or too large based on a spacing threshold (step 208). If the track radius is acceptable, then it is determined if one or more sectors of the track 15 include squeeze (AC squeeze). Sector spacing for the next sector is calculated using WRO measurements (step 210). It is then determined if the sector spacing is acceptable (step 212). If the sector spacing is unacceptable, either the sector is mapped out or a correction term is determined and written in the corresponding servo wedge 13a to effectively correct the sector spacing (step 214). If another sector remains to be tested in the track 15 (step 218), then steps 210–214 are repeated. If no other sectors remain to be tested in the track 15 (step 218), then if other tracks 15 remain to be tested (step 220) then the servo controller 24 seeks to the next track 15 (step 204).

After determining the AC squeeze for each sector, the amount and track location of the squeeze can be logged. In one example, the AC squeeze information is placed in a self-test log, and the squeeze locations in the log are stored in a sector defect list (map) in the disk drive 10. Thereafter, when the disk drive 10 is operating, the servo controller 24 checks the defect list and skips writing to a defective (squeezed) location/sector.

If the track radius (spacing) is unacceptable (step 208), then a correction term is determined and written in the servo wedges 13a of the track 15 to effectively reposition the track 15 to the correct radius (step 222), and the process proceeds to step 220. In one implementation of steps 206, 208 and 222, if the track radius is not acceptable then the track 15 that is too close to or too far from the adjacent track 15 is effectively repositioned. To prevent encroachment, the radial position of the squeeze track 15 (the track 15 with incorrect radius) is corrected.

Figure 8B:
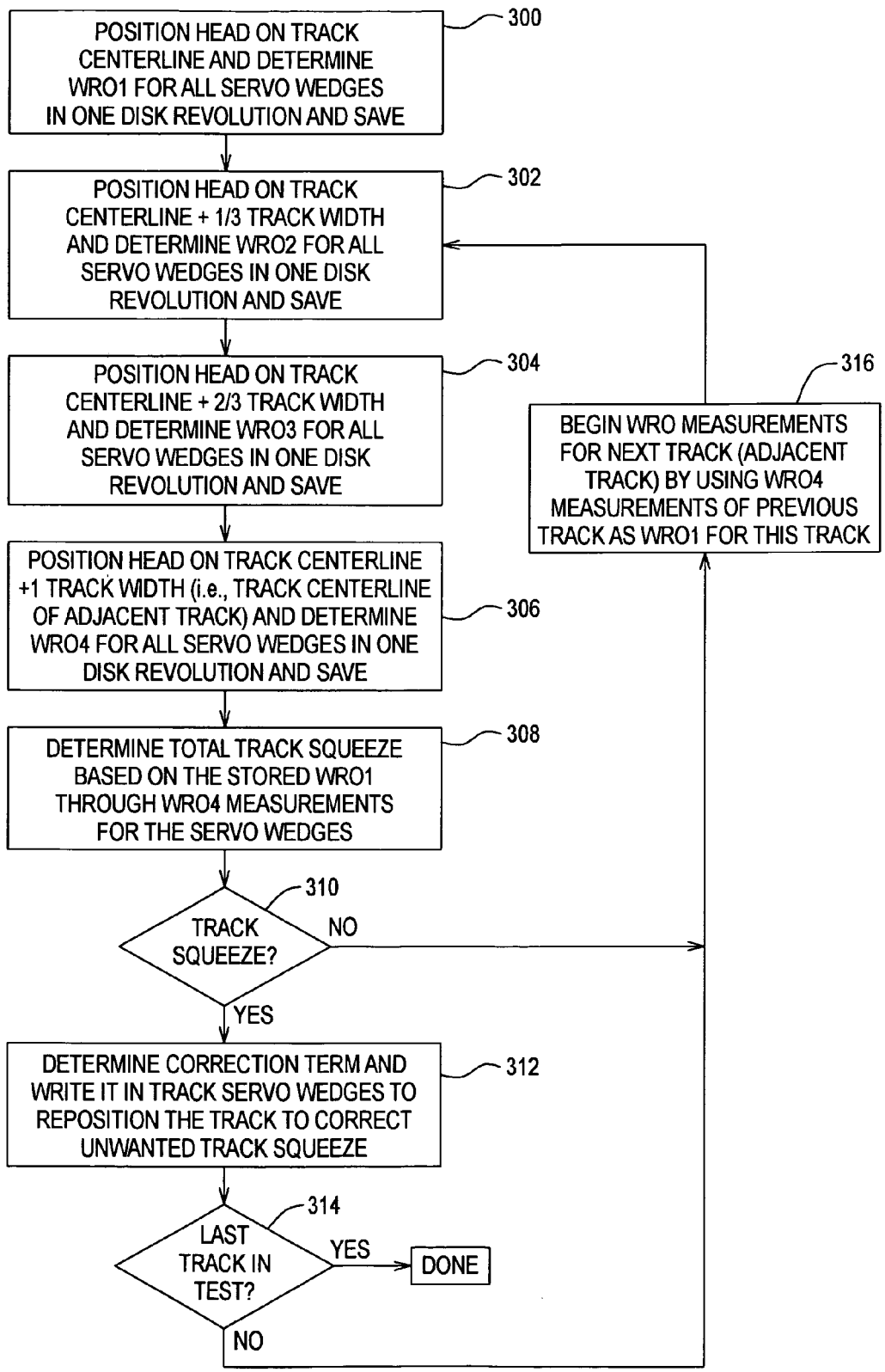
FIG. 8B shows another example flowchart of track spacing measurement and correction.

FIG. 8B shows a flowchart of another track spacing measurement and correction process. The process is best understood in conjunction with FIG. 3. To determine squeeze for track Tn, WRO1 in each servo wedge 13a is measured at track centerline Tn in one revolution of the disk 12 (step 300), then WRO2 in each servo wedge 13a is measured at track Tn–1/3 track width in another revolution of the disk 12 (step 302), then WRO3 in each servo wedge 13a is measured at track Tn–2/3 track width in another revolution of the disk 12 (step 304) and then WRO4 in each servo wedge 13a is measured at track centerline Tn–1 in another revolution of the disk 12 (step 306). The 4 WRO measurements per servo wedge 13a occur in different revolutions of the disk 12 by moving the head 14 from track Tn to Tn–1 in the increments of 1/3 track width per disk revolution. Although 4 WRO measurements at 1/3 track widths are used in the example, other numbers of WRO measurements at other fractional track widths are contemplated by the present invention. From the WRO information, the squeeze between the adjacent tracks Tn and Tn–1 is determined.

The DC squeeze (SQDC) in servo track units between tracks Tn and Tn–1 can be determined based on the 4 WRO measurements by the following relations (step 308):

$$SQDC(n)=f[WRO(n)+2WRO(n-\tfrac{1}{3})+2WRO(n-\tfrac{2}{3})\\+WRO(n-1)] \quad (7)$$

or with WRO_AVE taken into account:

$$SQDC(n)=[WRO(n)-WRO\_AVE]+2[WRO(n-\tfrac{1}{3})\\-WRO\_AVE]+2[WRO(n-\tfrac{2}{3})-WRO\_AVE]+\\[WRO(n-1)-WRO\_AVE] \quad (8)$$

Since the WRO measurements are made at every 1/3 track width, WRO(n) (e.g., WRO1) and WRO(n–1) (e.g., WRO4) are measured on the centerlines of the adjacent tracks Tn and Tn–1, respectively, and WRO(n–1/3) (e.g., WRO2) and WRO(n−⅔) (e.g., WRO3) are measured at ⅓ and ⅔ track width, respectively, from the track centerline Tn towards the track centerline Tn−1. WRO(n−⅓) and WRO(n−⅔) are selected at the norm/quad nulls between tracks Tn and Tn−1. At the norm/quad null, two servo bursts are low signal value and two servo bursts are high signal value at that location—e.g., A burst low, B burst high, C burst low and D burst high. The WRO(n), WRO(n−⅓), WRO(n−⅔) and WRO(n−1) measurements for the servo wedges 13a of tracks Tn and Tn−1 are made in consecutive revolutions of the disk 12 and combined to calculate the SQDC for track Tn. The WRO can be measured on a sector, track or cylinder basis. Each WRO measurement is taken at a different revolution of the disk 12. Then the WRO data is averaged around one track revolution to obtain the WRO for track Tn. The WRO data can be averaged down a disk stack (with multiple disks 12) to obtain the WRO for a cylinder.

After the SQDC is calculated it is determined if there is unwanted squeeze (step 310). In one example, a positive SQDC means tracks Tn and Tn−1 are too close together, and a negative SQDC means tracks Tn and Tn−1 are too far apart. In case the SQDC indicates radial misposition of essentially the entire track Tn, that can be corrected by effectively repositioning track Tn by determining a correction term and writing it in the track Tn servo wedges 13a to effectively reposition track Tn by counteracting the squeeze (step 312).

Then it is determined if there is another track to be tested (step 314). If not, the process is completed. Otherwise, the WRO for the next track (Tn−1) commences, and WRO4 of the previous track (Tn) is used as WRO1 for the track (Tn−1) (step (316) and the process returns to step 302. Thus, after WRO measurements are made along a track, three revolutions of the disk 12 are used to make three WRO measurements for the adjacent track.

In the example, four measurements of WRO (one per disk 12 revolution) are used for each track squeeze calculation. However, in measuring squeeze in consecutive tracks 15, after squeeze is calculated for a first track 15, the last WRO measurement of the first track 15 is used as the first WRO measurement for the next track 15, thereby saving a disk 12 revolution. For example, after squeeze is calculated for the first track 15, a test scan of three revolutions of the disk 12 per track 15 is performed to measure WRO at a different position of the head 14 relative to the centerline of the track 15. The head 14 is first positioned at the track centerline for one WRO measurement per servo wedge 13a in a first revolution of the disk 12, then the head 14 is moved ⅓ track towards the ID of the disk 12 relative to the track centerline for a second WRO measurement per servo wedge 13a in a second revolution of the disk 12, and then the head 14 is moved ⅓ track towards the ID of the disk 12 relative to the track centerline for a third WRO measurement per servo wedge 13a in a third revolution of the disk 12. The WRO information from the three revolutions of the disk 12 is used to determine squeeze between the track and an adjacent track based on the SQ relations above.

The AC squeeze based on WRO is also proportional to the differences A−B and C−D.

Figure 9:
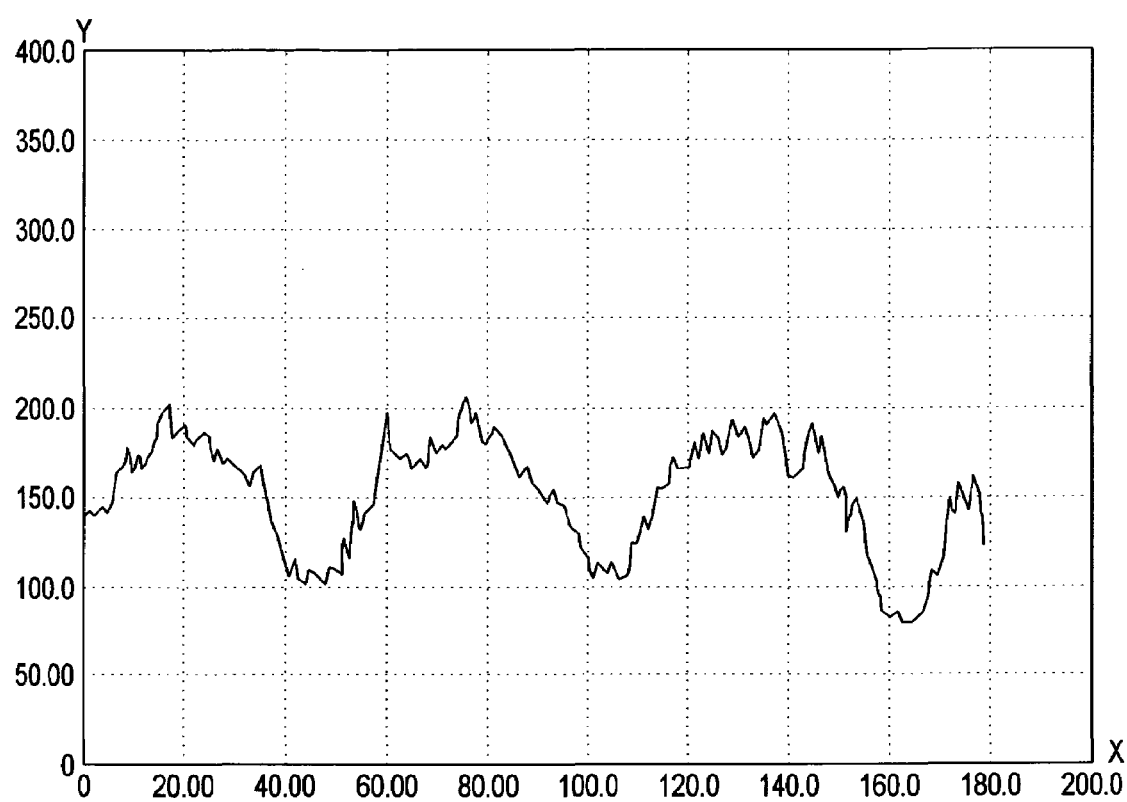
FIG. 9 shows an example WRO plot of a track based on servo burst signal value differences where some sectors of the track have improper track spacing.

FIG. 9 shows an example WRO time capture equivalent plot for a track based on the burst differences (A−B) and (C−D), with the servo-wedges 13a passing under the head 14 (or time) on the horizontal axis (X) and the signal amplitude on the vertical axis (Y). This example shows 10% track peak-to-peak misposition at three track locations (peaks) due to AC squeeze that was written into the servo bursts. Once the AC squeeze locations at the servo wedges 13a are determined based on the WRO, appropriate action such as mapping out the corresponding data sectors can be performed.

Rather than mapping out, the sector squeeze information can be used to trigger embedded repeatable runout correction (ERC) to correct the AC squeeze. The ERC removes runout from a track, making it more circular. An example ERC is provided in copending U.S. application Ser. No. 09/753,969 filed on Jan. 2, 2001, entitled "Method and Apparatus for the Enhancement of Embedded Runout Correction in a Disk Drive", which is incorporated herein by reference. The ERC is written in RRO fields in the servo wedges, and upon disk drive operation, the servo controller uses the ERC to position the head to avoid perturbations.

In one example, to calculate squeeze, WRO is measured at 4 locations—on the two adjacent tracks and the two norm/quad nulls between the adjacent tracks. The WRO at the norm/quad nulls contributes 2× to the squeeze at this location.

For example, for (A−B)−(C−D), the PES and WRO are determined as:

PES=LinB1[(A−B)−(C−D)]/$2^{11}$, in servo track units
WRO=LinB1[(A−B)+(C−D)]/$2^{11}$, in servo track units LinB1 compensates for burst signal value variations for the 4 servo burst calculations such that the linear position of the burst difference signals is used in the PES calculations. The WRO values are used in the above SQ relations, where WRO1 and WRO4 are measured on the adjacent tracks, and WRO2 and WRO3 are measured at the norm/quad nulls between the tracks. The SQ values are the squeeze between the tracks. This squeeze is written as the squeeze correction terms in the RRO fields in the servo wedges 13a of the squeeze track 15 to correct for the radius squeeze. In addition, one RRO field corresponds to the read position of the head 14 and another RRO field corresponds to the write position of the head 14.

Figure 10A:
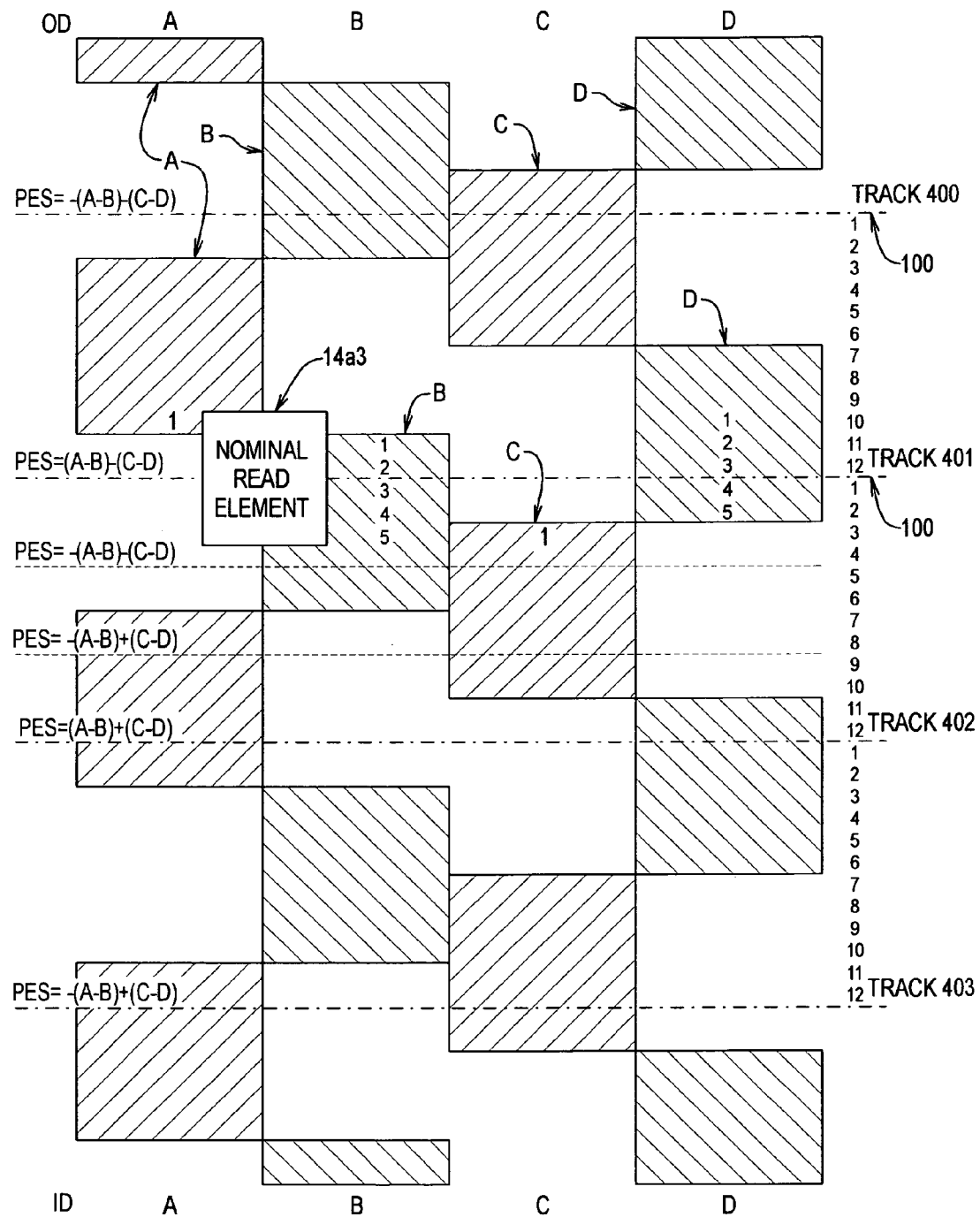
FIG. 10A shows multiple track centerlines defined by example nominal burst placements without squeeze.
Figure 10B:
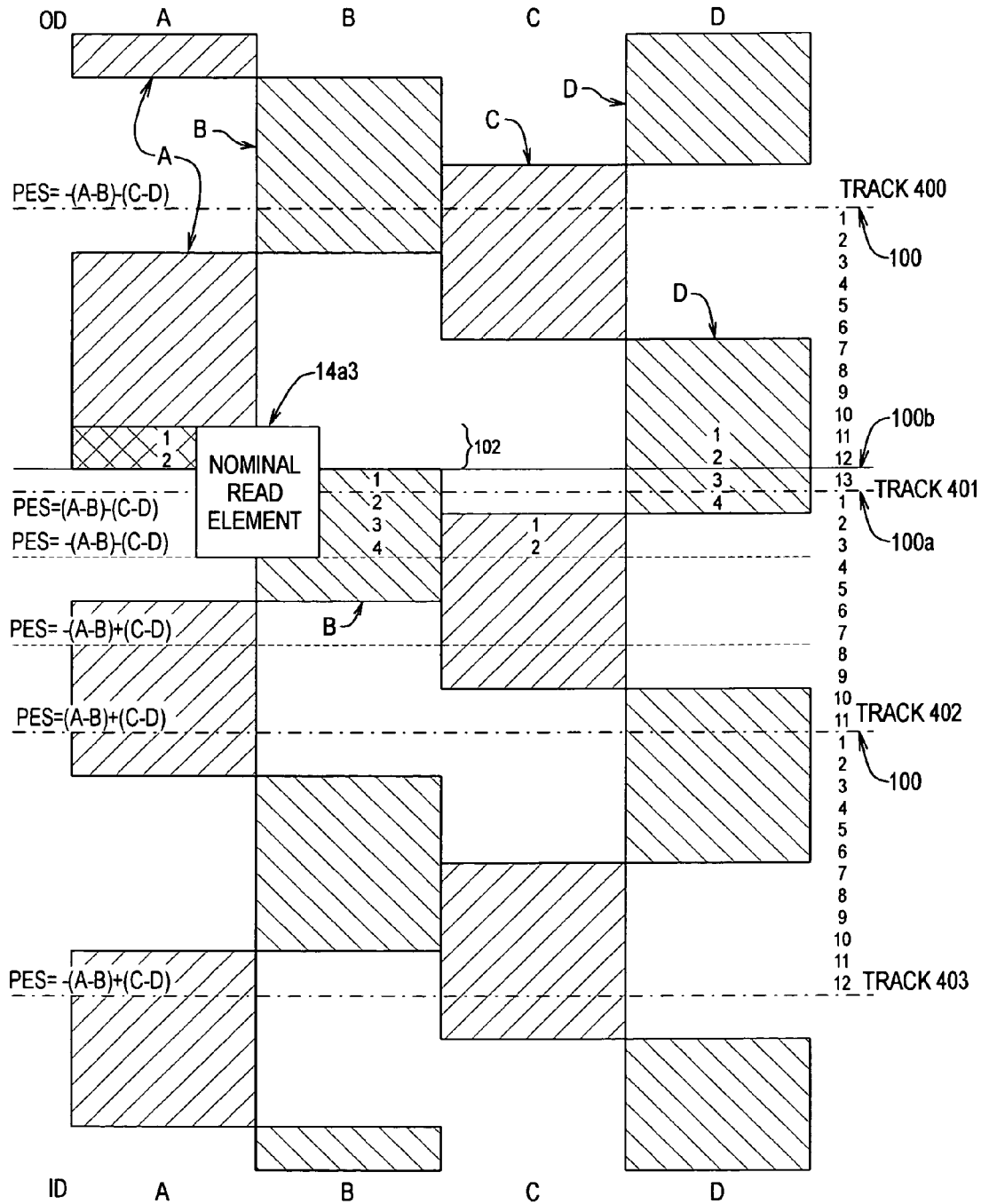
FIG. 10B shows an example burst placement where a burst seam is misplaced and a track is squeezed.
Figure 10C:
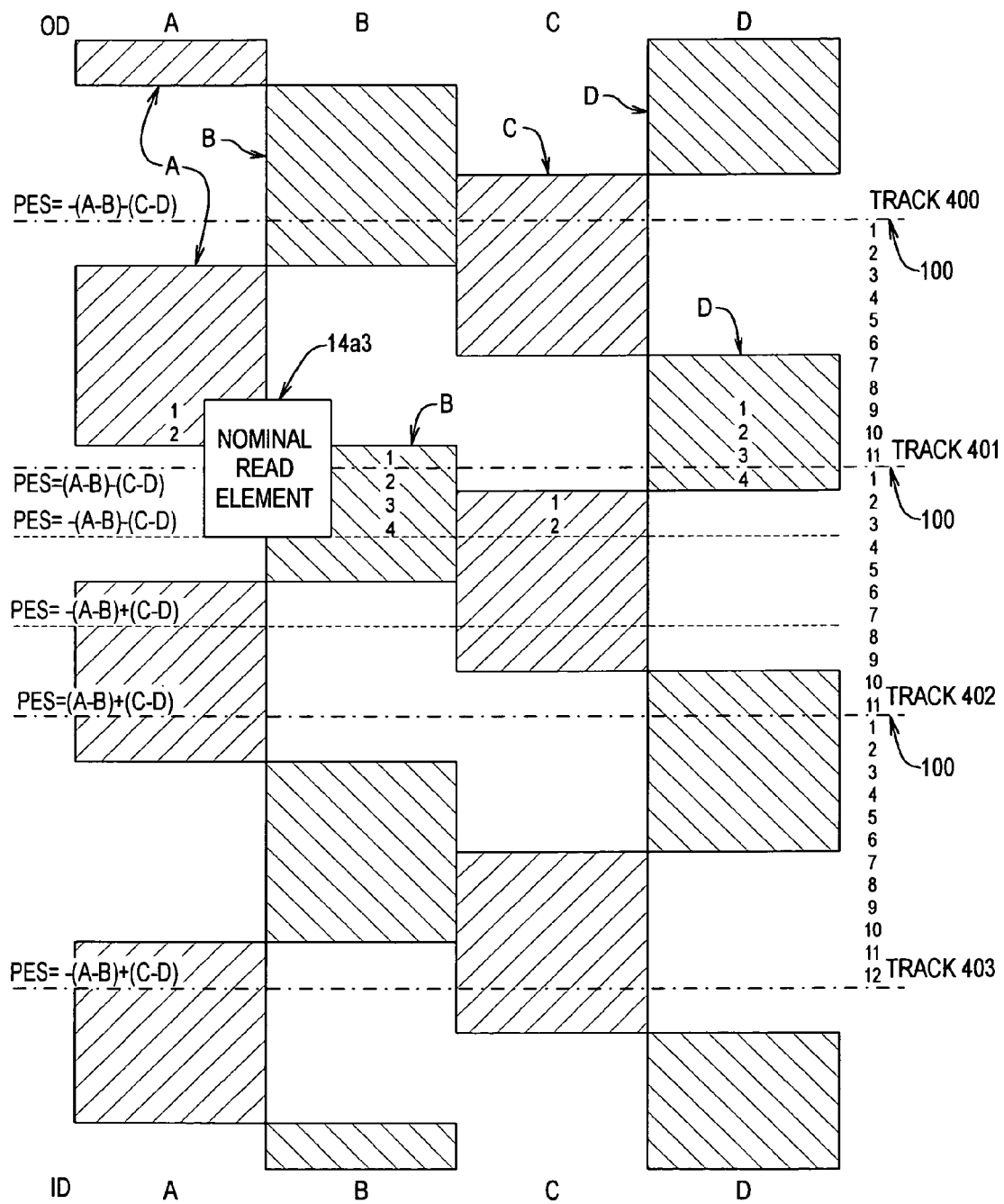
FIG. 10C shows an example burst placement where a range of tracks are misplaced.

FIGS. 10A–10C show tracks 400 to 403 with the track centerlines 100 defined by the A, B, C and D bursts, a nominal read element 14a3 of the head 14, the PES for tracks 400 to 403, and the PES at different positions relative to track 1. Tracks 400 to 403 have a track spacing of 12 as indicated by the division marks 1, 2, 3, 4 . . . 12 between the adjacent track centerlines 100.

FIG. 10A shows tracks 400 to 403 without squeeze.

FIG. 10B shows an example burst placement where burst seam 102 (between the A and B bursts) is misplaced and track 401 is squeezed. The burst seam 102 in each servo wedge 13a of track 401 is misplaced, and all other nearby burst seams are nominal as in FIG. 10A. The main failure mode is caused by the single burst seam 102 being misplaced. The track centerline 100a of track 401 is closer than average to track 402 and farther than average from track 400. A method for implementing the squeeze correction term for repositioning track 401 based on the measured DC squeeze includes moving only track 401 by the measured squeeze to the corrected track centerline 100b of track 401.

Another method for implementing the squeeze correction term for repositioning based on the measured DC squeeze uses localized optimization which corrects a track based upon the nearby tracks when a burst seam is misplaced. This is also applicable to servo writing discontinuities shown by example in FIG. 10C, where a range of track centerlines 100 such as for tracks 401 and 402 are squeezed compared to the nominal track centerlines 100 in FIG. 10A. To correct for squeeze, the servo writing discontinuities are spread out over many tracks. An example process includes driving the average squeeze over a range of tracks to a reduced acceptable value by repositioning each track of interest (another technique uses a recursive filter).

More than one track may have to be repositioned to spread a single squeeze event over several tracks. In one example, severe squeeze between two adjacent tracks is distributed among several tracks (e.g., 5 or 10 tracks depending on squeeze amount) so that each corrected track centerline is spaced relative to the adjacent tracks where the severe squeeze is reduced, and there is essentially no squeeze (e.g., slight squeeze without encroachment). The tracks are repositioned to redistribute the squeeze when there is increased TPI (localized bunching of the tracks) followed by reduced TPI. Thus, there can be different spacings between different tracks. The above relations correct track radius (reposition tracks) in these situations as well. Further, the track repositioning (correcting the track centerline) can be distributed among several squeeze tracks.

FIGS. 11A–D show tracks 500 to 506 with track centerlines 100 defined by the A, B, C, D bursts in each servo wedge 13a and the corresponding RRO field 106 following the servo bursts 13c in each servo wedge 13a. Tracks 500 to 506 have a track spacing of 12 as indicated by the division marks 1, 2, 3, 4 . . . 12 between the adjacent track centerlines 100. In each servo wedge 13a of track 501, the A, B burst seam 102 and C, D burst seam 104 cause the track centerline 100a of track 501 to be closer than average to track 502. As a result, the track centerline 100a of track 501 is moved (repositioned) to the corrected track centerline 100b by placing a squeeze correction term in the corresponding RRO field 106a. FIGS. 11A–D also show the PES for tracks 501 to 506 based on track modes 1, 3, 5, 7 and a maximum read element 14a1, minimum read element 14a2, nominal read element 14a3 and minimum write element 14b of the head 14.

If it becomes necessary to reposition a track by more than 10% track width, and each RRO field 106 is written in the nominal track position for correcting the track centerline 100, then the servo controller 14 may have difficulty reading the RRO fields 106 since the track may be repositioned beyond the OTRC of the head 14. Therefore, it is desirable to stitch together multiple RRO fields 106 such that the squeeze correction terms in the RRO fields 106 can be read at both the corrected and uncorrected track centerlines 100. In track 501, two RRO fields are written to effectively generate a wide RRO field. The squeeze correction term is written in a first RRO field 106a at the original track centerline 100a (before the correction is applied), and the squeeze correction term is written again in a second (stitched) RRO field 106b at the corrected track centerline 100b. The RRO fields 106a and 106b lineup in time (similar to servo 2 gray code) and effectively form a wide RRO field for track 501.

During disk drive 10 operation, initially upon seeking to track 501 and reading the servo bursts 13c in a servo wedge 13a, the servo controller 24 follows the original (uncorrected) track centerline 100a until it reads the squeeze correction term in the first RRO field 106a and thereafter moves the head 14 to the corrected track centerline 100b. If the corrected track centerline 100b is more than 10% track width away from the original uncorrected track centerline 100a, then in the next servo wedge 13a the head 14 is too far away from the first RRO field 106a in the next servo wedge 13a to read the squeeze correction term therein. Instead, the servo controller 24 reads the squeeze correction term in the second RRO field 106b in that servo wedge 13a. Therefore, the squeeze correction term can be read over a greater radial range relative to track 501.

In one example, the track spacing measurement and radial misposition correction process is stored in the utility zone of the disk 12 as assembly code for execution by the disk drive 10 electronics. In another example, the process is implemented in firmware in the disk drive 10 electronics.

In another example, the host computer 26 can be a test station to determine track spacing and squeeze and to correct for mispositioned sectors or tracks. The squeeze detection and correction processes are performed during disk drive 10 self test where other ERC is applied. As those skilled in the art appreciate, other implementations are contemplated by the present invention.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of determining written in runout (WRO) in a disk drive, wherein the disk drive includes a data recording disk and a transducer head, the disk includes a servo wedge and first and second tracks, the servo wedge extends radially across the tracks and include includes circumferentially sequential, radially offset servo bursts, the tracks are adjacent to one another, the first track has a track width, the first track includes a first track centerline, the second track includes a second track centerline, the track centerlines are separated from one another by a track spacing, and the head reads data from and writes data to the tracks, the method comprising the steps of:

(a) positioning the head at a first radial position relative to the tracks;
(b) reading a first combination of the servo bursts using the head at the first radial position during a first revolution of the disk to generate first readback signals;
(c) measuring first burst signals from the first readback signals;
(d) obtaining a combination of the first burst signals to generate a first burst phase;
(e) positioning the head at a second radial position relative to the tracks;
(f) reading a second combination of the servo bursts using the head at the second radial position during a second revolution of the disk to generate second readback signals;
(g) measuring second burst signals from the second readback signals;
(h) obtaining a combination of the second burst signals to generate a second burst phase; and
(i) determining an WRO for the first track using the burst phases, wherein the WRO indicates the track spacing.

2. The method of claim 1, wherein the radial positions are radially spaced from one another by less than the track spacing.

3. The method of claim 2, wherein the first radial position is closer to the first track centerline than to the second track centerline and the second radial position is closer to the second track centerline than to the first track centerline.

4. The method of claim 3, wherein the first radial position is the first track centerline and the second radial position is between the track centerlines.

5. The method of claim 3, wherein the first radial position is between the track centerlines and the second radial position is the second track centerline.

6. The method of claim 3, wherein the radial positions are between the track centerlines.

7. The method of claim 6, wherein the first radial position is ⅓ the track width from the first track centerline and the second radial position is ⅔ the track width from the first track centerline.

8. The method of claim 6, wherein the first radial position is a norm/quad null between the track centerlines and the second radial position is another norm/quad null between the track centerlines.

9. The method of claim 1, wherein the first radial position is the first track centerline and the second radial position is the second track centerline.

10. The method of claim 1, wherein the revolutions are consecutive revolutions.

11. The method of claim 1, wherein the servo bursts include an A burst, a B burst, a C burst and a D burst, and the WRO is determined using a difference in the burst signals of the A and B bursts (A–B) and a difference in the burst signals of the C and D bursts (C–D).

12. The method of claim 1, wherein the radial positions are radially spaced from one another by less than the track spacing, the first radial position is closer to the first track centerline than to the second track centerline, the second radial position is closer to the second track centerline than to the first track centerline, the revolutions are consecutive revolutions, the servo bursts include an A burst, a B burst, a C burst and a D burst, and the WRO is determined using a difference in the burst signals of the A and B bursts (A–B) and a difference in the burst signals of the C and D bursts (C–D).

13. A method of determining written in runout (WRO) in a disk drive, wherein the disk drive includes a data recording disk and a transducer head, the disk includes a servo wedge and first and second tracks, the servo wedge extends radially across the tracks and include includes circumferentially sequential, radially offset servo bursts, the tracks are adjacent to one another, the first track has a track width, the first track includes a first track centerline, the second track includes a second track centerline, the track centerlines are separated from one another by a track spacing, and the head reads data from and writes data to the tracks, the method comprising the steps of:

(a) positioning the head at a first radial position relative to the tracks;

(b) reading a first combination of the servo bursts using the head at the first radial position during a first revolution of the disk to generate first readback signals;

(c) measuring first burst signals from the first readback signals;

(d) obtaining a combination of the first burst signals to generate first burst phases;

(e) positioning the head at a second radial position relative to the tracks, wherein the second radial position is closer to the second track centerline than the first radial position is to the second track centerline;

(f) reading a second combination of the servo bursts using the head at the second radial position during a second revolution of the disk to generate second readback signals;

(g) measuring second burst signals from the second readback signals;

(h) obtaining a combination of the second burst signals to generate second burst phases;

(i) positioning the head at a third radial position relative to the tracks, wherein the third radial position is closer to the second track centerline than the second radial position is to the second track centerline;

(j) reading a third combination of the servo bursts using the head at the third radial position during a third revolution of the disk to generate third readback signals;

(k) measuring third burst signals from the third readback signals;

(l) obtaining a combination of the third burst signals to generate third burst phases;

(m) positioning the head at a fourth radial position relative to the tracks, wherein the fourth radial position is closer to the second track centerline than the third radial position is to the second track centerline;

(n) reading a fourth combination of the servo bursts using the head at the fourth radial position during a fourth revolution of the disk to generate fourth readback signals;

(o) measuring fourth burst signals from the fourth readback signals;

(p) obtaining a combination of the fourth burst signals to generate fourth burst phases; and (q) determining an WRO for the first track based on the first, second, third and fourth burst phases, wherein the WRO indicates the track spacing.

14. The method of claim 13, wherein the first and second, second and third, and third and fourth radial positions are radially spaced from one another by less than the track width.

15. The method of claim 14, wherein the first and second, second and third, and third and fourth radial positions are radially spaced from one another by ⅓ the track width.

16. The method of claim 14, wherein the first radial position is the first track centerline, the second radial position is a norm/quad null between the centerlines, the third radial position is another norm/quad null between the centerlines and the fourth radial position is the second track centerline.

17. The method of claim 13, wherein the servo bursts include an A burst, a B burst, a C burst and a D burst.

18. The method of claim 17, wherein the first, second, third and fourth burst phases are proportional to a difference in the burst signals of the A and B bursts (A–B) and to a difference in the burst signals of the C and D bursts (C–D).

19. The method of claim 17, wherein:

at the first radial position, the WRO is a function of [(A–B)+(C–D)];

at the second radial position, the WRO is a function of [(A–B)–(C–D)];

at the third radial position, the WRO is a function of [-(A–B)–(C–D)]; and at the fourth radial position, the WRO is a function of [-(A–B)+(C–D)].

20. The method of claim 17, wherein a position error signal (PES) positions the head over the tracks, and at the first radial position, the PES is a function of [(A–B)–(C–D)];

at the second radial position, the PES is a function of [-(A–B)–(C–D)];

at the third radial position, the PES is a function of [-(A–B)+(C–D)]; and at the fourth radial position, the PES is a function of [(A–B)+(C–D)].

21. The method of claim 17, wherein a position error signal (PES) positions the head over the tracks, and at the first radial position, the WRO is a function of [(A–B)+(C–D)] and the PES is a function of [(A–B)–(C–D)];

at the second radial position, the WRO is a function of [(A–B)–(C–D)] and the PES is a function of [-(A–B)–(C–D)];

at the third radial position, the WRO is a function of [-(A–B)–(C–D)] and the PES is a function of [-(A–B)+(C–D)]; and at the fourth radial position, the WRO is a function of [-(A–B)+(C–D)] and the PES is a function of [(A–B)+(C–D)].

22. The method of claim 13, wherein the first, second, third and fourth revolutions are consecutive revolutions.

23. A method of determining written in runout (WRO) in a disk drive having a data recording disk and a transducer head, wherein the disk includes concentric data tracks and servo wedges embedded within the tracks, each of the servo wedges includes circumferentially sequential, radially offset servo bursts, and the head is positionable over the tracks for recording and playback of data on the tracks, the method comprising the steps of:

(a) positioning the head relative to a track;

(b) reading the servo bursts in the servo wedges using the head to generate readback signals, wherein the head reads the servo bursts at multiple positions relative to a track centerline of the track during multiple revolutions of the disk to generate the readback signals;

(c) measuring burst signals of the servo bursts from the readback signals;

(d) obtaining combinations of the burst signals to generate burst phases; and (e) determining an WRO for the track based on the burst phases, wherein the WRO indicates a track spacing of the track relative to an adjacent track.

24. The method of claim 23, wherein the WRO is a function of the track spacing.

25. The method of claim 23, wherein step (e) includes obtaining orthogonal combinations of the burst phases.

26. The method of claim 23, wherein the servo bursts in each servo wedge include an A burst, a B burst, a C burst and a D burst.

27. The method of claim 26, wherein step (d) includes selecting pairs of the burst signals and generating the burst phases from the pairs of the burst signals.

28. The method of claim 27, wherein in step (d) a first burst phase is proportional to a difference in the burst signals of the A and B bursts (A–B).

29. The method of claim 28, wherein in step (d) a second burst phase is proportional to a difference in the burst signals of the C and D bursts (C–D).

30. The method of claim 29, wherein in step (e) the WRO is a function of the first and second burst phases.

31. The method of claim 30, wherein in step (e) the WRO is based on a different combination of the burst phases depending on a position of the head relative to the track centerline.

32. The method of claim 31, wherein:

for a first position of the head relative to the track centerline, the WRO is a function of [(A–B)+(C–D)];

for a second position of the head relative to the track centerline, the WRO is a function of [(A–B)–(C–D)];

for a third position of the head relative to the track centerline, the WRO is a function of [-(A–B)–(C–D)]; and for a fourth position of the head relative to the track centerline, the WRO is a function of [-(A–B)+(C–D)].

33. The method of claim 31, wherein a position error signal (PES) is based on the burst signals to position the head over the track, and for a first position of the head relative to the track centerline, the WRO is a function of [(A–B)+(C–D)] and the PES is a function of [(A–B)–(C–D)];

for a second position of the head relative to the track centerline, the WRO is a function of [(A–B)–(C–D)] and the PES is a function of [-(A–B)–(C–D)];

for a third position of the head relative to the track centerline, the WRO is a function of [-(A–B)–(C–D)] and the PES is a function of [-(A–B)+(C–D)]; and for a fourth position of the head relative to the track centerline, the WRO is a function of [-(A–B)+(C–D)] and the PES is a function of [(A–B)+(C–D)].

34. A method of determining track spacing in a disk drive having a data recording disk and a transducer head, wherein the disk includes concentric data tracks and servo wedges embedded within the tracks, each of the servo wedges includes circumferentially sequential, radially offset servo bursts, and the head is positionable over the tracks for recording and playback of data on the tracks, the method comprising the steps of:

(a) positioning the head relative to a track;

(b) reading the servo bursts in the servo wedges using the head to generate readback signals, wherein the head reads the servo bursts at multiple positions relative to a track centerline of the track during multiple revolutions of the disk to generate the readback signals;

(c) measuring burst signals of the servo bursts from the readback signals; and (d) determining a track spacing of the track relative to an adjacent track based on combinations of the burst signals.

35. The method of claim 34, wherein the combinations of the burst signals represent written in runout (WRO) in the track.

36. The method of claim 35, wherein step (d) includes:

(i) selecting a plurality of the servo bursts in each servo wedge and obtaining combinations of the burst signals of the selected servo bursts to generate burst phases; and (ii) determining an WRO for each servo wedge at the track based on the burst phases, wherein the WRO is a function of the track spacing.

37. The method of claim 36, wherein step (d) includes performing steps (i) and (ii) for the servo wedges over the multiple revolutions of the disk.

38. The method of claim 37, wherein step (d) includes:

performing steps (i) and (ii) for the servo wedges over the multiple revolutions of the disk, wherein the head is at a different position relative to the track centerline for each revolution of the disk; and determining the track spacing as a function of the WROs for the servo wedges.

39. The method of claim 38, wherein the servo bursts in each servo wedge include an A burst, a B burst, a C burst and a D burst.

40. The method of claim 39, wherein step (d) includes selecting pairs of the burst signals and generating the burst phases from the pairs of the burst signals.

41. The method of claim 40, wherein in step (d) a first burst phase is proportional to a difference in the burst signals of the A and B bursts (A–B).

42. The method of claim 41, wherein in step (d) a second burst phase is proportional to a difference in the burst signals of the C and D bursts (C–D).

43. The method of claim 42, wherein in step (d) the VVRO is a function of the first and second burst phases.

44. The method of claim 43, wherein in step (d) the WRO is based on a different combination of the burst phases depending on a position of the head relative to the track centerline.

45. The method of claim 44, wherein:
for a first position of the head relative to the track centerline, a first WRO (WRO1) is a function of [(A–B)+(C–D)];
for a second position of the head relative to the track centerline, a second WRO (WRO2) is a function of [(A–B)–(C–D)];
for a third position of the head relative to the track centerline, a third WRO (WRO3) is a function of [-(A–B)–(C–D)]; and
for a fourth position of the head relative to the track centerline, a fourth WRO (WRO4) is a function of [-(A–B)+(C–D)].

46. The method of claim 45, wherein a position error signal (PES) is based on the burst signals to position the head over the track, and
for the first position of the head relative to the track centerline, the PES is a function of [(A–B)–(C–D)];
for the second position of the head relative to the track centerline, the PES is a function of [-(A–B)–(C–D)];
for the third position of the head relative to the track centerline, the PES is a function of [-(A–B+(C–D)]; and
for the fourth position of the head relative to the track centerline, the PES is a function of [(A–B)+(C–D)].

47. The method of claim 45, wherein in step (d) the track spacing is a function of WRO1, WRO2, WRO3 and WRO4.

48. The method of claim 47, wherein in step (d) the track spacing is a function of [WRO1+2WRO2+2WRO3+WRO4].

49. The method of claim 43, wherein in step (d), for each track n, the track spacing (SQ(n)) is a function (f) according to the relation:

$$SQ(n)=f[WRO(n)+2WRO(n-\tfrac{1}{3})+2WRO(n-\tfrac{2}{3})+WRO(n-1)]$$

and the WRO measurements are made at every ⅓ track width per revolution of the disk, WRO(n) and WRO(n−1) are measured at track centerlines of the adjacent tracks n and n−1, respectively, WRO(n−⅓) and WRO(n−⅔) are measured at ⅓ and ⅔ track width from the track centerline of the track n, and the WRO(n), WRO(n−⅓), WRO(n−⅔) and WRO(n−1) are measured in consecutive revolutions of the disk.

50. A method of determining written in runout (WRO) in a disk drive having a data recording disk and a transducer head, wherein the disk includes concentric data tracks and servo wedges embedded within the tracks, each of the servo wedges includes circumferentially sequential, radially offset servo bursts, and the head is positionable over the tracks for recording and playback of data on the tracks, the method comprising the steps of:
(a) positioning the head relative to a track;
(b) reading the servo bursts in the servo wedges using the head to generate readback signals, wherein the servo bursts in the servo wedges include an A burst, a B burst, a C burst and a D burst;
(c) measuring burst signals of the servo bursts from the readback signals;
(d) obtaining combinations of the burst signals to generate burst phases, including selecting pairs of the burst signals and generating the burst phases from the pairs of the burst signals, wherein a first burst phase is proportional to a difference in the burst signals of the A and B bursts (A–B), and a second burst phase is proportional to a difference in the burst signals of the C and D bursts (C–D); and
(e) determining an WRO for the track based on the burst phases, wherein the WRO indicates a track spacing of the track relative to an adjacent track, the WRO is a function of the first and second burst phases, the WRO is based on a different combination of the burst phases depending on a position of the head relative to a track centerline of the track, and a position error signal (PES) is based on the burst signals to position the head over the track, and
for a first position of the head relative to the track centerline, the WRO is a function of [(A–B)+(C–D)] and the PES is a function of [(A–B)–(C–D)];
for a second position of the head relative to the track centerline, the WRO is a function of [(A–B)–(C–D)] and the PES is a function of [-(A–B)–(C–D)];
for a third position of the head relative to the track centerline, the WRO is a function of [-(A–B)–(C–D)] and the PES is a function of [-(A–B)+(C–D)]; and
for a fourth position of the head relative to the track centerline, the WRO is a function of [-(A–B)+(C–D)] and the PES is a function of [(A–B)+(C–D)].

51. A method of determining track spacing in a disk drive having a data recording disk and a transducer head, wherein the disk includes concentric data tracks and servo wedges embedded within the tracks, each of the servo wedges includes circumferentially sequential, radially offset servo bursts, and the head is positionable over the tracks for recording and playback of data on the tracks, the method comprising the steps of:
(a) positioning the head relative to a track;
(b) reading the servo bursts in the servo wedges using the head to generate readback signals;
(c) measuring burst signals of the servo bursts from the readback signals; and
(d) determining a track spacing of the track relative to an adjacent track based on combinations of the burst signals, wherein the combinations of the burst signals represent written in runout (WRO) in the track, including
(i) selecting a plurality of the servo bursts in each servo wedge and obtaining combinations of the burst signals of the selected servo bursts to generate burst phases;
(ii) determining an WRO for each servo wedge at the track based on the burst phases, wherein the WRO is a function of the track spacing;
performing steps (i) and (ii) for the servo wedges over multiple revolutions of the disk, wherein the head is at a different position relative to a track centerline of the track for each revolution of the disk; and
determining the track spacing as a function of the WROs for the servo wedges at the track.

52. The method of claim 51, wherein the servo bursts in each servo wedge include an A burst, a B burst, a C burst and a D burst.

53. The method of claim 52, wherein step (d) includes selecting pairs of the burst signals and generating the burst phases from the pairs of the burst signals.

54. The method of claim 53, wherein in step (d) a first burst phase is proportional to a difference in the burst signals of the A and B bursts (A–B).

55. The method of claim 54, wherein in step (d) a second burst phase is proportional to a difference in the burst signals of the C and D bursts (C–D).

56. The method of claim 55, wherein in step (d) the WRO is a function of the first and second burst phases.

57. The method of claim 56, wherein in step (d) the WRO is based on a different combination of the burst phases depending on a position of the head relative to the track centerline.

58. The method of claim 57, wherein:
for a first position of the head relative to the track centerline, a first WRO (WRO1) is a function of $[(A-B)+(C-D)]$;
for a second position of the head relative to the track centerline, a second WRO (WRO2) is a function of $[-(A-B)-(C-D)]$;
for a third position of the head relative to the track centerline, a third WRO (WRO3) is a function of $[-(A-B)-(C-D)]$; and
for a fourth position of the head relative to the track centerline, a fourth WRO (WRO4) is a function of $[-(A-B)+(C-D)]$.

59. The method of claim 58, wherein a position error signal (PES) is based on the burst signals to position the head over the track, and
for the first position of the head relative to the track centerline, the PES is a function of $[(A-B)-(C-D)]$;
for the second position of the head relative to the track centerline, the PES is a function of $[-(A-B)-(C-D)]$;
for the third position of the head relative to the track centerline, the PES is a function of $[-(A-B+(C-D)]$; and
for the fourth position of the head relative to the track centerline, the PES is a function of $[(A-B)+(C-D)]$.

60. The method of claim 58, wherein in step (d) the track spacing is a function of WRO1, WRO2, WRO3 and WRO4.

61. The method of claim 60, wherein in step (d) the track spacing is a function of $[WRO1+2WRO2+2WRO3+WRO4]$.

62. The method of claim 56, wherein in step (d), for each track n, the track spacing (SQ(n)) is a function (f) according to the relation:

$$SQ(n)=f[WRO(n)+2WRO(n-\tfrac{1}{3})+2WRO(n-\tfrac{2}{3})+WRO(n-1)]$$

and the WRO measurements are made at every ⅓ track width per revolution of the disk, WRO(n) and WRO(n−1) are measured at track centerlines of the adjacent tracks n and n−1, respectively, WRO(n−⅓) and WRO(n−⅔) are measured at ⅓ and ⅔ track width from the track centerline of the track n, and the WRO(n), WRO(n−⅓), WRO(n−⅔) and WRO(n−1) are measured in consecutive revolutions of the disk.

* * * * *